United States Patent
Jeon et al.

(10) Patent No.: US 12,437,439 B2
(45) Date of Patent: Oct. 7, 2025

(54) APPARATUS FOR ACCELERATING SIMULTANEOUS LOCALIZATION AND MAPPING AND ELECTRONIC DEVICE INCLUDING THE SAME

(71) Applicants: SAMSUNG ELECTRONICS CO., LTD., Suwon-si (KR); University of Seoul Industry Cooperation Foundation, Seoul (KR)

(72) Inventors: Myungjae Jeon, Yongin-si (KR); Kichul Kim, Seoul (KR); Namseop Kwon, Suwon-si (KR); Yongkyu Kim, Hwaseong-si (KR); Hongseok Lee, Seoul (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 478 days.

(21) Appl. No.: 17/868,453

(22) Filed: Jul. 19, 2022

(65) Prior Publication Data
US 2023/0145875 A1 May 11, 2023

(30) Foreign Application Priority Data
Nov. 2, 2021 (KR) .................. 10-2021-0149020

(51) Int. Cl.
*G06T 7/73* (2017.01)
*G06T 19/00* (2011.01)

(52) U.S. Cl.
CPC .............. *G06T 7/73* (2017.01); *G06T 19/006* (2013.01)

(58) Field of Classification Search
CPC ............... G06T 7/73; G06T 19/006; G06T 2207/30241; G06T 2207/30244; G06T 2207/10016; G06T 7/246
See application file for complete search history.

(56) References Cited

U.S. PATENT DOCUMENTS

2005/0238200 A1 10/2005 Gupta et al.
2014/0192055 A1* 7/2014 Kim ...................... G06T 19/006
345/427

(Continued)

FOREIGN PATENT DOCUMENTS

CN 103426186 A * 12/2013
CN 107808362 A * 3/2018

(Continued)

OTHER PUBLICATIONS

Ruckert, D. et al., "Snake-SLAM: Efficient Global Visual Inertial SLAM using Decoupled Nonlinear Optimization" 2021 International Conference on Unmanned Aircraft Systems (ICUAS), IEEE, (Jun. 15, 2021), pp. 219-228, XP033942469, https://github.com/darglein/Snake-SLAM, DOI: 10.1109/ICUAS51884.2021.9476760.

(Continued)

*Primary Examiner* — Chan S Park
*Assistant Examiner* — Sebastian-Sy Vuchi Ngo
(74) *Attorney, Agent, or Firm* — Sughrue Mion, PLLC

(57) ABSTRACT

An apparatus for accelerating simultaneous localization and mapping (SLAM) includes a SLAM processor including a front-end processor and a back-end processor. The front-end processor is configured to track a position of a first feature, among features extracted from a first frame, in a second frame subsequent to the first frame, and the back-end processor is configured to obtain a first measurement regarding a map point and a camera pose of the first feature based on the position of the first feature in the second frame (Continued)

tracked by the front-end processor, compute elements affecting an optimization matrix in relation to the first measurement, among elements of a Hessian matrix regarding the map point and the camera pose, and accumulate the computed elements in the optimization matrix used to perform an optimization operation with respect to states of the map point and the camera pose.

22 Claims, 26 Drawing Sheets

(56) References Cited

U.S. PATENT DOCUMENTS

| | | |
|---|---|---|
| 2016/0350906 A1 | 12/2016 | Meier et al. |
| 2018/0189587 A1 | 7/2018 | Mandal et al. |
| 2019/0035099 A1 * | 1/2019 | Ebrahimi Afrouzi ... G06T 7/344 |
| 2019/0042195 A1 | 2/2019 | Kalsi et al. |
| 2019/0219401 A1 | 7/2019 | Daniilidis et al. |
| 2020/0257721 A1 | 8/2020 | McKinnon et al. |
| 2021/0358206 A1 * | 11/2021 | Song ................. G01C 21/005 |
| 2022/0358262 A1 | 11/2022 | Jeon et al. |

FOREIGN PATENT DOCUMENTS

| | | | | |
|---|---|---|---|---|
| CN | 110618854 A | * | 12/2019 | ........... G06F 21/566 |
| EP | 3667236 A1 | * | 6/2020 | ............. B60R 11/04 |
| WO | WO-2017142977 A1 | * | 8/2017 | ............. G06T 19/00 |
| WO | WO-2018156069 A1 | * | 8/2018 | ............. A01G 23/00 |

OTHER PUBLICATIONS

Youyang, F., et al., "Incremental 3-D pose graph optimization for SLAM algorithm without marginalization", International Journal of Advanced Robotic Systems, [Online] vol. 17, No. 3, (May 1, 2020), XP055930794, DOI: 10.1177/1729881420925304.

Ruckert, D. et al., "An Efficient Solution to Structured Optimization Problems using Recursive Matrices", Computer Graphics Forum:Journal of the Curopean Association for Computer Graphics, Wileyblackwell, Oxford, vol. 38, No. 8, (Nov. 14, 2019), pp. 33-39, XP071489807, DOI: 10.1111/cgf.13758.

Communication issued Mar. 28, 2023 from European Patent Office in EP Patent Application No. 22202788.0.

* cited by examiner

APPARATUS FOR ACCELERATING SIMULTANEOUS LOCALIZATION AND MAPPING AND ELECTRONIC DEVICE INCLUDING THE SAME

CROSS-REFERENCE TO RELATED APPLICATION

This application is based on and claims priority under 35 U.S.C. §119 to Korean Patent Application No. 10-2021-0149020, filed on Nov. 2, 2021, in the Korean Intellectual Property Office, the disclosure of which is incorporated by reference herein in its entirety.

BACKGROUND

1. Field

The disclosure relates to apparatuses for accelerating simultaneous localization and mapping (SLAM) and electronic devices including the apparatuses.

2. Description of the Related Art

Simultaneous localization and mapping (SLAM) refers to a technology involving an apparatus configured to move along an arbitrary space to obtain peripheral information and estimate a map of the space and a current position of the apparatus based on the obtained peripheral information. For example, an apparatus for performing SLAM may obtain an image of a peripheral space through a sensor such as a camera, etc., and estimate a map of the space and a current location of the apparatus through analysis of the obtained image and coordinates set-up.

SLAM has become popular as a key technology in the field of augmented reality (AR) which facilitates a virtual reality environment by adding virtual objects and information to an actual environment so that they appear as if they were in the existing environment. In particular, the AR has been developed to be implemented by various types of wearable devices, which can be mounted on the human body. Among such wearable devices, glasses-type wearable devices may be mounted on a user's head to provide an AR service to the user through a display of the device.

A wearable device may estimate, through SLAM, a pose of the wearable device worn by the user, and may provide an image regarding the pose of the wearable device through a display. However, when there is a discrepancy between an image provided to the user and an actual pose of the wearable device, the user may feel a sense of difference between the provided image and the actual space.

To reduce the discrepancy between the image provided to the user and the actual pose of the wearable device, a high-performance processor capable of fast computation is required. Also, the higher the performance of a processor, the more power the processor may consume, which leads to an increased size of the processor and further, to degraded comfort when wearing the wearable device. Accordingly, there has been a demand for processors capable of performing the SLAM operation rapidly while maintaining comfort when wearing the wearable device by minimizing the power consumption.

SUMMARY

Provided are apparatuses for accelerating simultaneous localization and mapping (SLAM), the apparatuses capable of performing SLAM operations quickly with low power, and electronic devices including the apparatuses.

The objectives that embodiments of the disclosure seek to achieve are not limited to the foregoing, and other embodiments which are not covered herein may also be clearly understood by a person of ordinary skill in the art from the descriptions and attached drawings below.

Additional aspects will be set forth in part in the description which follows and, in part, will be apparent from the description, or may be learned by practice of the presented embodiments of the disclosure.

According to an aspect of the disclosure, there is provided an apparatus for accelerating simultaneous localization and mapping (SLAM), the apparatus including: a SLAM processor including: a front-end processor configured to track, in a second frame subsequent to a first frame, a position of a first feature, among a plurality of features extracted from the first frame; and a back-end processor configured to: obtain a first measurement corresponding to a map point and a camera pose of the first feature based on the position of the first feature in the second frame tracked by the front-end processor; compute one or more elements affecting an optimization matrix related to the first measurement, among a plurality of elements of a Hessian matrix regarding the map point and the camera pose; and accumulate the computed one or more elements in the optimization matrix used to perform an optimization operation with respect to one or more states of the map point and the camera pose.

The SLAM processor may further include a pipelined structure configured to: track a position of the first feature in a first cycle, obtain the first measurement based on the position of the first feature tracked through consecutive cycles, and sequentially perform first operations associated with the first measurement, and obtain, when a position of a second feature different from the first feature, is tracked in a second cycle subsequent to the first cycle, a second measurement based on the position of the second feature after performing the first operations associated with the first measurement, and perform second operations associated with the second measurement.

The front-end processor may be further configured to extract features from the first frame when a number of features extracted from the first frame is less than or equal to a designated number.

The front-end processor may be further configured to: estimate expected positions of the features extracted from the first frame in the second frame based on inertial information of the apparatus; determine a size of a patch to track the extracted features based on an uncertainty of the extracted features; and determine a tracking order of the extracted features based on the expected positions of the extracted features in the second frame.

The back-end processor may be further configured to compute elements of a first matrix block regarding the camera pose, elements of a second matrix block regarding the map point, and elements of a third matrix block regarding a correspondence between the camera pose and the map point, by using the first measurement.

The back-end processor may be further configured to perform, when elements sequentially computed with respect to all measurements of the extracted features are accumulated in the optimization matrix, the optimization operation with respect to the one or more states of the map point and the camera pose using the optimization matrix.

The first measurement may include a map point obtained based on data obtained from a sensor including a camera and an inertial measurement unit (IMU), and at least one camera pose corresponding to the map point.

The back-end processor may be further configured to divide the first measurement into a first part corresponding to both the camera and the IMU, and a second part corresponding to only the IMU, among the camera and the IMU.

The back-end processor may be further configured to: compute elements of a first matrix block regarding the camera pose, elements of a second matrix block regarding the map point, and elements of a third matrix block regarding a correspondence between the camera pose and the map point, by using the first part, and accumulate the computed elements of the first matrix block, the second matrix block and the third matrix block in the optimization matrix by using the first part, and compute elements of the first matrix block regarding the camera pose by using the second part, and accumulate the computed elements of the first matrix block in the optimization matrix.

The apparatus may further include a transformation processor configured to perform operations with respect to the second part, wherein the transformation processor may include: a matrix processing unit configured to perform operations with respect to a designated matrix; a vector processing unit configured to perform operations with respect to a designated vector; and a Lie algebra processing unit configured to perform Lie algebra operations to convert the designated matrix into the designated vector.

According to another aspect of the disclosure, there is provided a method of accelerating simultaneous localization and mapping (SLAM), the method including: tracking, in a second frame subsequent to a first frame, a position of a first feature, among a plurality of features extracted from the first frame; obtaining a first measurement corresponding to a map point and a camera pose of the first feature based on the tracked position of the first feature in the second frame; computing one or more elements affecting an optimization matrix related to the first measurement, among a plurality of elements of a Hessian matrix regarding the map point and the camera pose; and accumulating the computed one or more elements in the optimization matrix used to perform an optimization operation with respect to one or more states of the map point and the camera pose.

The method may further include tracking a position of the first feature in a first cycle, obtaining the first measurement based on the position of the first feature tracked through consecutive cycles, and sequentially performing first operations associated with the first measurement; and obtaining, when a position of a second feature, which is different from the first feature, is tracked in a second cycle subsequent to the first cycle, a second measurement based on the position of the second feature after performing the first operations associated with the first measurement, and performing second operations associated with the second measurement.

The method may further include estimating expected positions of the features extracted from the first frame in the second frame based on inertial information; determining a size of a patch to track the extracted features based on an uncertainty of the extracted features; and determining a tracking order of the extracted features based on the expected positions of the extracted features in the second frame.

The computing of the one or more elements affecting the optimization matrix related to the first measurement may include computing elements of a first matrix block regarding the camera pose, elements of a second matrix block regarding the map point, and elements of a third matrix block regarding a correspondence between the camera pose and the map point, by using the first measurement.

The method may further include performing the optimization operation with respect to the one or more states of the map point and the camera pose by using the optimization matrix when elements sequentially computed with respect to all measurements of the extracted features are accumulated in the optimization matrix.

The first measurement may include a map point obtained based on data obtained from a sensor including a camera and an inertial measurement unit (IMU), and at least one camera pose corresponding to the map point.

The method may further include dividing the first measurement into a first part corresponding to both the camera and the IMU, and a second part corresponding to only the IMU.

The method may further include computing elements of a first matrix block regarding the camera pose, elements of a second matrix block regarding the map point, and elements of a third matrix block regarding a correspondence between the camera pose and the map point, by using the first part, and accumulating the computed elements of the first matrix block, the second matrix block and the third matrix block in the optimization matrix by using the first part; and computing elements of the first matrix block regarding the camera pose by using the second part, and accumulating the computed elements of the first matrix block in the optimization matrix by using the second part.

According to another aspect of the disclosure, there is provided an electronic device including: a sensor including a camera configured to obtain image data and an inertial measurement unit (IMU) configured to obtain inertial information of the electronic device; and a SLAM processor including: a front-end processor configured to track, in a second frame subsequent to a first frame, a position of a first feature, among a plurality of features extracted from the first frame; and a back-end processor configured to: obtain a first measurement corresponding to a map point and a camera pose of the first feature based on the position of the first feature in the second frame tracked by the front-end processor; compute one or more elements affecting an optimization matrix related to the first measurement, among a plurality of elements of a Hessian matrix regarding the map point and the camera pose; and accumulate the computed one or more elements in the optimization matrix used to perform an optimization operation with respect to one or more states of the map point and the camera pose.

The electronic device is a single System-on-Chip.

According to another aspect of the disclosure, there is provided an apparatus including: a memory storing one or more instructions; and a processor configured to execute the one or more instructions to: extract a first feature from a first frame; identify a position of the first feature in a second frame subsequent to the first frame; obtain a first measurement corresponding to a map point and a camera pose of the first feature based on the position of the first feature in the second frame; obtain one or more elements, among a plurality of elements of a Hessian matrix corresponding to the map point and the camera pose; accumulate the one or more elements in an optimization matrix; and perform an optimization operation based on the optimization matrix.

The processor may include: a front-end processor configured to extract the first feature from the first frame, and identify the position of the first feature in the second frame; and a back-end processor configured to obtain the first measurement, obtain the one or more elements; accumulate the one or more elements in the optimization matrix, and perform the optimization operation based on the optimization matrix.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6 to 12 are diagrams for explaining a process of performing an optimization operation with respect to states of a map point and a camera pose, according to an example embodiment;

FIGS. 17 to 19 are diagrams illustrating a camera Hessian matrix, an inertial measurement unit (IMU) Hessian matrix, and a final S matrix, according to an example embodiment;

DETAILED DESCRIPTION

Figure 1:
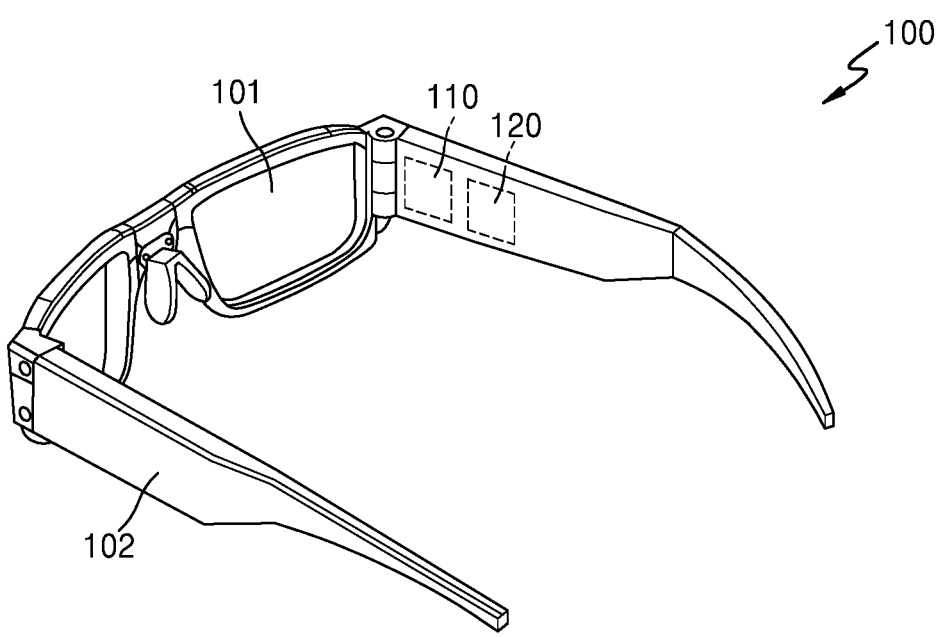
FIG. 1 is a perspective view of an electronic device according to an example embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

General terms which are currently used widely have been selected for use in consideration of their functions in embodiments; however, such terms may be changed according to an intention of a person skilled in the art, precedents, advent of new technologies, etc. Further, in certain cases, terms have been arbitrarily selected, and in such cases, meanings of the terms will be described in detail in corresponding descriptions. Accordingly, the terms used in the embodiments should be defined based on their meanings and overall descriptions of the embodiments, not simply by their names.

In some descriptions of the embodiments, when a portion is described as being connected to another portion, the portion may be connected directly to another portion, or electrically connected to another portion with an interposing portion therebetween. When a portion "includes" an element, another element may be further included, rather than excluding the existence of the other element, unless otherwise described.

The terms "comprise" or "include" used in the embodiments should not be construed as including all components or operations described in the disclosure, and may be understood as not including some of the components or operations, or further including additional components or operations.

While such terms as "first," "second," etc., may be used to describe various components, such components must not be limited to the above terms. The above terms are used only to distinguish one component from another.

The descriptions of the following embodiments should not be construed as limiting the scope of rights, and matters that those of ordinary skill in the art can easily derive should be construed as being included in the scope of rights of the embodiments. Hereinafter, embodiments will be described in detail as an example, with reference to the attached drawings.

FIG. 1 is a perspective view of an electronic device according to an example embodiment.

With reference to FIG. 1, an electronic device 100 may include a lens 101, a connecting portion 102 to be fixed on a user's body part (e.g., head), a sensor 110, and an accelerator 120. According to an example embodiment, the electronic device 100 may estimate a peripheral map of the electronic device 100 and/or a pose of the electronic device 100.

The sensor 110 may sense data regarding a peripheral environment of the electronic device 100, and the data sensed by the sensor 110 (or "sensing data") may be transmitted to the accelerator 120 electrically or operationally connected to the sensor 110. For example, the sensor 110 may include at least one of at least one camera, an inertial measurement unit (IMU), a depth sensor (e.g., LiDAR), a global positioning system (GPS), and an odometer, but the disclosure is not limited thereto.

The accelerator 120 may refer to a processing unit or a processor optimized for performing SLAM operations, and in some embodiments, the accelerator 120 may be referred to as an "SLAM accelerator" or an "apparatus for accelerating SLAM." For example, the accelerator 120 may be implemented by an array of multiple logic gates, or may be implemented by a combination of a general purpose microprocessor and a memory in which a program executable by the microprocessor is stored; however, the disclosure is not limited thereto.

The accelerator 120 may estimate a peripheral map of the electronic device 100 and/or a pose of the electronic device 100 by performing SLAM based on the data obtained by the sensor 110.

Throughout the disclosure, the term "SLAM" may refer to a technology involving an apparatus configured to move along an arbitrary space to obtain peripheral information and estimate a map of the space and a current position of the apparatus based on the obtained information.

Further, the term "pose of electronic device" may refer to data including position information of an electronic device throughout the disclosure. According to an example embodiment, the data including position information of an electronic device may be referred to as pose data. According to an example embodiment, the pose data may include 6 degrees of freedom pose information, and the 6 degrees of freedom pose information may include information indicating a position of the electronic device 100, and information indicating an orientation of the electronic device 100.

According to an example embodiment, the accelerator 120 may extract features (or "keypoints") of the data obtained by the sensor 110, and perform operations with respect to spatial coordinates. For example, the accelerator 120 may extract at least one feature from the image data obtained by the camera based on a feature extraction algorithm. Further, the accelerator 120 may perform operations with respect to spatial coordinates of the electronic device 100 based on data regarding inertial information (e.g., velocity, acceleration, angular velocity, angular acceleration, etc.) of the electronic device 100 obtained from the IMU. That is, the accelerator 120 may perform front-end operations of SLAM.

According to an example embodiment, the accelerator 120 may estimate a peripheral map and a pose of the electronic device 100 by performing optimization with respect to the extracted features and spatial coordinates. For example, the accelerator 120 may perform the optimization with respect to the extracted features and spatial coordinates through bundle adjustment (BA), and estimate a peripheral map and a pose of the electronic device 100. In other words, the accelerator 120 may perform front-end operations of SLAM, and then further perform back-end operations of SLAM based on results of the front-end operations.

That is, the electronic device 100 according to an example embodiment may rapidly execute the SLAM operation with low power through the accelerator 120 optimized for executing the front-end operations and the back-end operations of SLAM. Accordingly, as the electronic device 100 may execute the SLAM operation rapidly without becoming larger to supply power to the accelerator 120, the wearing sensation of the electronic device 100 may be maintained while accelerating the SLAM operation.

According to an example embodiment, the electronic device 100 may generate an augmented reality (AR) image based on a peripheral map and a pose of the electronic device 100 estimated through the accelerator 120, and display the generated AR image through a display (e.g., lens 101 of FIG. 1).

In the disclosure, the term "AR image" may refer to an image in which an image of the peripheral real world is combined with a virtual image. For example, an AR image may refer to an image of the real world overlaid with virtual images; however, the disclosure is not limited thereto.

At this time, the image of the real world may refer to a real scene which a user can see through the electronic device 100, and may include real world objects. Further, the virtual image may refer to an image which does not exist in the real world but is formed by graphics processing, and may include digital or AR objects.

In an example embodiment, the electronic device 100 may be a glasses-type wearable electronic device which may be mounted on the user's ears as shown in FIG. 1, but the disclosure is not limited thereto. In another embodiment, the electronic device 100 may be a head-mount type wearable electronic device which may be mounted on the user's head.

According to an example embodiment, the sensor 110 and the accelerator 120 may be arranged at the connecting portion 102; however, the arrangement of the sensor 110 and the accelerator 120 is not limited thereto. In another embodiment, the sensor 110 and/or the accelerator 120 may be arranged at a peripheral area of the lens 101 (e.g., frame).

Although they are shown in the drawings, the electronic device 100 may include optical components for emitting light including data regarding an AR image, and adjusting a travel route of the emitted light. The accelerator 120 may emit light including data regarding the AR image through the optical components, and the emitted light may arrive at the lens 101.

As the light including the data regarding the AR image arrives at the lens 101, the AR image may be displayed at the lens 101, and the electronic device 100 may provide the AR image to a user (or "wearer") through the aforementioned processes.

The foregoing embodiments only describe the electronic device 100 as a wearable electronic device but the application fields of the electronic device 100 are not limited thereto. According to an example embodiment, the electronic device 100 may be applied to an unmanned aerial vehicle (UAV), a robot, a drone, and/or an autonomous vehicle which are capable of estimating a peripheral map and a pose through SLAM.

Hereinafter, with reference to FIG. 2, the optical components of the electronic device 100 are described in detail.

Figure 2:
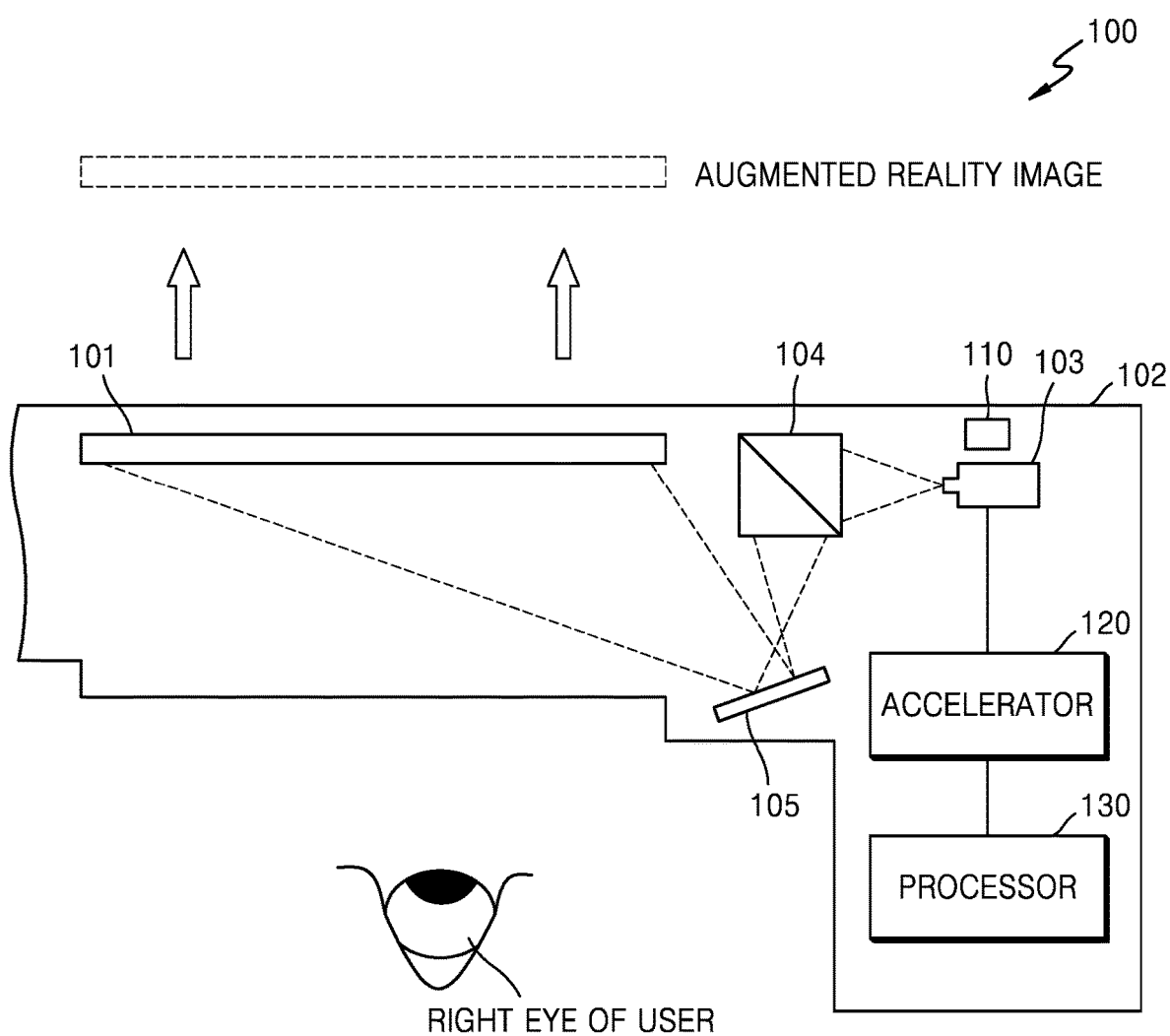
FIG. 2 is a cross-sectional view of a part of the electronic device of FIG. 1.

FIG. 2 is a cross-sectional view of a part of the electronic device of FIG. 1.

FIG. 2 illustrates a cross-section of a part of the electronic device 100 of FIG. 1 adjacent to a right eye of a user. Further, the electronic device 100 of FIG. 2 may be a glasses-type wearable device mountable on the user's ears (e.g., AR glasses); however, types of the electronic device 100 are not limited to the example embodiments illustrated in the drawings.

With reference to FIG. 2, the electronic device 100 according to an example embodiment may include the lens 101, the connecting portion 102, a projector 103, a beam splitter 104, a mirror 105, the sensor 110, the accelerator 120, and a processor 130. One or more of the components of the electronic device 100 according to an example embodiment may be identical or similar to one or more of the components of the electronic device 100 of FIG. 1 and thus, any redundant description is omitted hereinafter.

The accelerator 120 may estimate a peripheral map and a pose of the electronic device 100 by executing the SLAM operation based on data regarding a peripheral environment of the electronic device 100 obtained through the sensor 110.

The processor 130 may generate an AR image based on the peripheral map and the pose of the electronic device 100 estimated through the accelerator 120, and may transmit the data regarding the generated AR image to the projector 103.

The projector 103 may emit light including the data regarding the AR image to the lens 101. For example, the processor 130 may be electrically or operationally connected to the projector 103 to control operations of the projector 103, and the projector 103 may be controlled by the processor 130 so that the light including the data regarding the AR image is emitted to the lens 101.

According to an example embodiment, the light emitted from the projector 103 may be reflected by the beam splitter 104 and/or the mirror 105 and arrive at the lens 101, but the disclosure is not limited thereto. According to an example embodiment, the projector 103 may be arranged to face the lens 101, and the light emitted from the projector 103 may arrive at the lens 101 without passing through the beam splitter 104 and/or the mirror 105.

As the light emitted from the projector 103 arrives at the lens 101, the AR image may be displayed at the lens 101, and as a result, the lens 101 may operate as a display to display the AR image of the electronic device 100.

When a user wears the electronic device 100, the lens 101 may be arranged to face an eye of the user (e.g., right eye of user in FIG. 2), and the electronic device 100 may provide the AR image to the user through the lens 101.

Hereinafter, the process of accelerating the SLAM operations by the accelerator 120 of FIG. 1 and/or the accelerator 120 of FIG. 2 is described in more detail.

Figure 3:
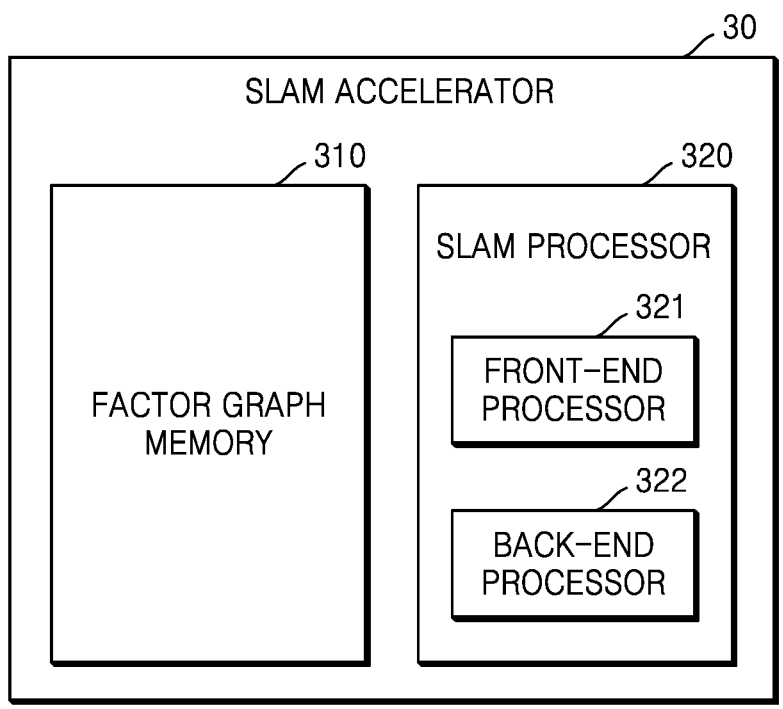
FIG. 3 is a block diagram illustrating components of an apparatus for accelerating simultaneous localization and mapping (SLAM), according to an example embodiment.

FIG. 3 is a block diagram illustrating components of an apparatus for accelerating SLAM according to an example embodiment.

With reference to FIG. 3, a SLAM accelerator 30 may be an apparatus for accelerating SLAM, and may include a factor graph memory 310 and a SLAM processor 320. The SLAM accelerator 30 according to an example embodiment may be substantially identical or similar to the accelerator 120 of FIG. 1 and/or FIG. 2 and thus, any redundant description is omitted hereinafter.

Although FIG. 1 and/or FIG. 2 illustrate an example embodiment in which the SLAM accelerator 30 is employed in AR glasses or smart glasses, the disclosure is not limited thereto. As such, according to another embodiment, the SLAM accelerator 30 may be employed in any device which requires recognition of location or space, such as robots, drones, autonomous cars, etc. without limitation.

The factor graph memory 310 may store various types of data processed in the SLAM accelerator 30. For example, the factor graph memory 310 may be electrically or operationally connected to the SLAM processor 320 and store data processed and/or data to be processed by the SLAM processor 320. The factor graph memory 310 may include random access memory (RAM), such as dynamic random access memory (DRAM), static random access memory (SRAM), etc., read-only memory (ROM), electrically erasable programmable read-only memory (EEPROM), a CD-ROM, a Blu-ray disk, other optical disk storages, a hard disk drive (HDD), a solid state drive (SSD), or flash memory; however, the disclosure is not limited thereto.

The SLAM processor 320 may control overall operations of the SLAM accelerator 30. For example, the SLAM processor 320 may execute front-end operations and back-end operations for optimization of SLAM. The SLAM processor 320 may be implemented by an array of multiple logic gates, or may be implemented by a combination of a general purpose microprocessor and a memory in which a program executable by the microprocessor is stored; however, the disclosure is not limited thereto.

According to an example embodiment, the SLAM processor 320 may include a front-end processor 321 for executing the front-end operations and a back-end processor 322 for executing the back-end operations.

The front-end processor 321 may receive sensing data from a sensor outside the SLAM accelerator 30, extract at least one feature based on the received data, and track a position of the extracted feature. According to an example embodiment, the sensor may be sensor 110 of FIG. 1. According to an example embodiment, the front-end processor 321 may extract features from a first frame of image data received from the sensor and track positions of the features extracted from the first frame in a second frame. According to an example embodiment, the second frame may be a frame subsequent to the first frame, and the front-end processor 321 may sense changes in features in consecutive frames by extracting and tracking the features. According to an example embodiment, the second frame may be a frame immediately subsequent to the first frame. However, the disclosure is not limited thereto. In other words, the front-end processor 321 may execute the front-end operations for SLAM optimization, and results of the front-end operations executed by the front-end processor 321 may be stored in the factor graph memory 310 or be transmitted to the back-end processor 322.

The back-end processor 322 may execute the back-end operations for SLAM optimization based on the result of operations executed by the front-end processor 321. For example, the back-end processor 322 may receive data obtained through the front-end operations executed by the front-end processor 321, and execute an optimization operation with respect to the received data.

According to an example embodiment, the back-end processor 322 may execute repetitive operations with respect to the data received from the factor graph memory 310 and/or the front-end processor 321. For example, the back-end processor 322 may execute operations for creating a peripheral map of an electronic device (e.g., electronic device 100 of FIG. 1 and/or FIG. 2) through repetitive matrix and/or vector operations.

In another example embodiment, the back-end processor 322 may estimate a pose of the electronic device in the created peripheral map. For example, the back-end processor 322 may estimate a pose of the electronic device moving on the map created through the repetitive operations. The back-end processor 322 may estimate the pose of the electronic device in real time, and data regarding the estimated pose of the electronic device may be updated in real time.

The operations performed by the back-end processor 322 may include bundle adjustment (BA). According to an example embodiment of the disclosure, when a set of images illustrating a plurality of three-dimensional (3D) points from different perspectives is given, the BA may refer to refinement of 3D coordinates explaining scene geometry, parameters of relative motion, and optical characteristics of the camera in real time according to optimization criteria that accompany image projections corresponding to the respective points.

Hereinafter, a process of tracking extracted features and optimizing 3D coordinates of a map point and a camera point by the SLAM processor 320 is described in detail with reference to FIGS. 4 to 12.

Figure 4:
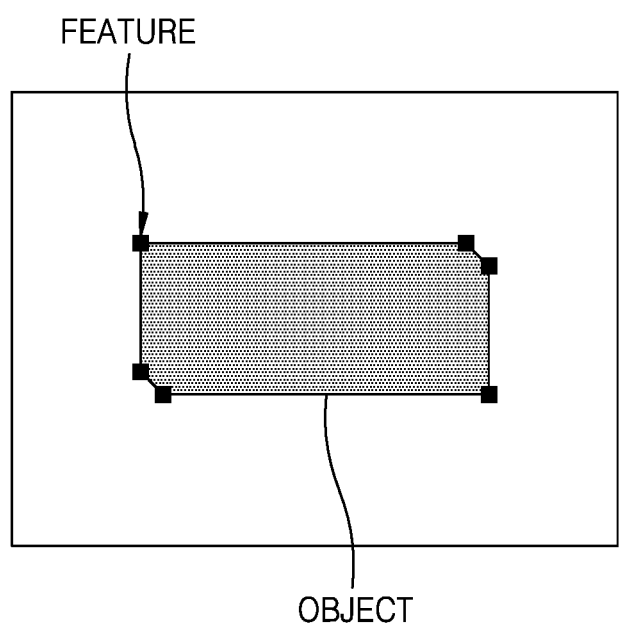
FIGS. 4 and 5 are diagrams for explaining a process of extracting features from image data and tracking positions of features, according to an example embodiment.
Figure 5:
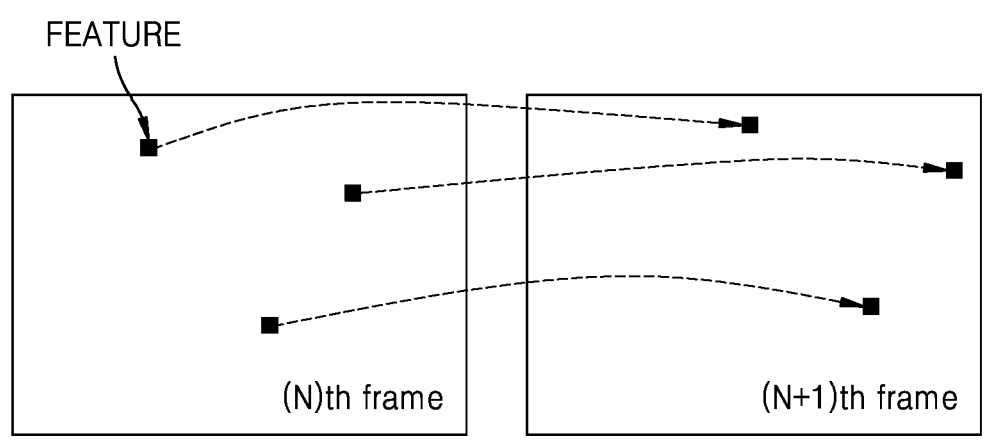

FIGS. 4 and 5 are diagrams for explaining a process of extracting features from image data and tracking positions of features, according to an example embodiment. FIGS. 4 and 5 illustrate data frames of image data obtained from a sensor (e.g., camera) and features extracted from the data frames.

With reference to FIG. 4, a SLAM accelerator according to an example embodiment (e.g., SLAM accelerator 30 of FIG. 3) may extract features regarding a peripheral object from image data obtained from a sensor.

According to an example embodiment, a front-end processor (e.g., front-end processor 321 of FIG. 3) of the SLAM accelerator may extract features from an object which appears in a first frame among data frames constituting the image data. For example, the front-end processor may extract features from an object which appears in the first frame through a feature extraction algorithm such as scale-invariant feature transform (SIFT), speeded-up robust features (SURF), and oriented fast and rotated brief (ORB), or a machine learning algorithm (e.g., deep learning); however, the disclosure is not limited thereto. According to an example embodiment, as shown in FIG. 4, the features may be extracted from a part having a characteristic, such as an edge or a corner of an object; however, the positions from which features are extracted are not limited to an edge or a corner of an object.

With reference to FIG. 5, the front-end processor of the SLAM accelerator according to an example embodiment may track position changes of features extracted from consecutive frames. For example, the front-end processor may track position changes of features between two consecutive frames, i.e., an $N^{th}$ frame (N is a natural number) and an $N+1^{th}$ frame. The front-end processor may track positions of features in consecutive frames through a Kanade-Lucas Tomasi tracker (KLT tracker); however, the disclosure is not limited thereto.

FIGS. 6 to 12 are diagrams for explaining a process of performing an optimization operation for states of a map point and a camera pose according to an example embodiment.

Figure 6:
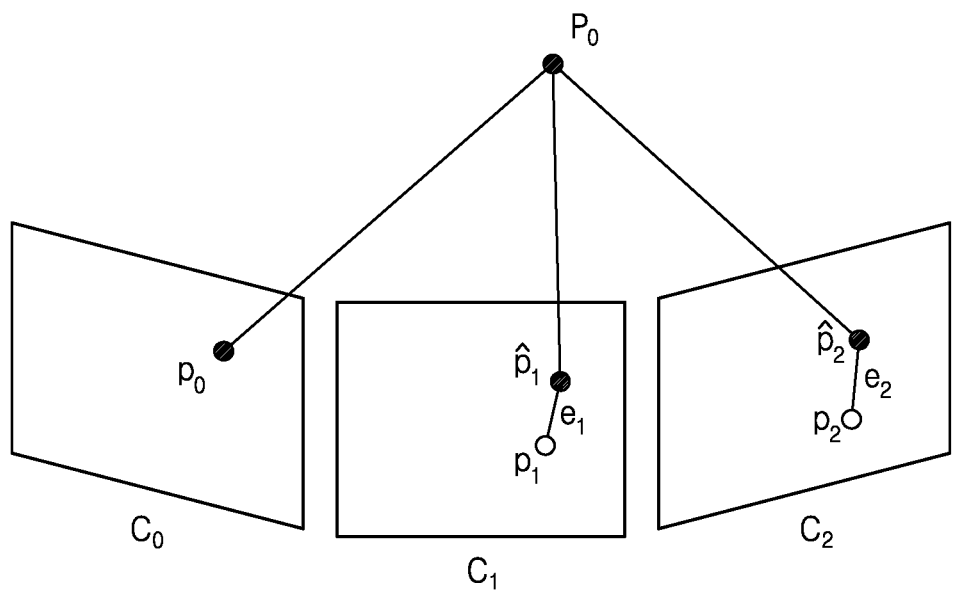

FIG. 6 illustrates the case, in which, an electronic device (e.g., electronic device 100 of FIG. 1 and/or FIG. 2) obtains an image regarding a peripheral space of the electronic device using a camera. According to a movement of the electronic device, a camera pose may be changed for each frame. Also, a location of a map point (or "landmark") in a frame captured by the camera may be changed as well. In the disclosure, the term "map point" may refer to a feature expressed as a 3D coordinate, and a position of a map point projected to a frame may be changed according to a camera pose for obtaining an image.

As shown in FIG. 6, the camera pose may change in order of $C_0$, $C_1$, and $C_2$ in accordance with time flow, and the location of the map point $P_0$ in a frame may also change in order of $p_0$, $p_1$, and $p_2$. Meanwhile, apart from the measurements $p_0$, $p_1$, and $p_2$ of the map point $P_0$, camera pose estimates $\widehat{p_0}$, $\widehat{p_1}$, and $\widehat{p_2}$ may be obtained by reprojection using 3D coordinates of the map point $P_0$. According to an example embodiment illustrated in FIG. 6, $p_0$ is identical to $\widehat{p_0}$, a description of $\widehat{p_0}$ is omitted.

A SLAM accelerator according to an example embodiment (e.g., SLAM accelerator 30 of FIG. 3) may track positions of features in consecutive frames, and execute the back-end operations of SLAM based on the tracked positions of the features. For example, a back-end processor (e.g., back-end processor 322 of FIG. 3) of the SLAM accelerator may execute the back-end operations of SLAM based on results of front-end operations executed by a front-end processor (e.g., front-end processor 321 of FIG. 3).

The back-end operations of SLAM may set an error "e" representing a difference between a measurement "p" and the estimate p̂ as an objective function, and include operations for estimating states in which the objective function is minimized for all measurements. The back-end operation of SLAM may be represented by the following Equation 1.

$$e_{i,j}(X) = p_{i,j} - \hat{p}(X), X = (P_j, C_i) \quad \text{[Equation 1]}$$

$$\operatorname{argmin}_X \sum_i \sum_j \|e_{i,j}(X)\|^2 \quad \begin{array}{l} i\text{:frame number} \\ j\text{:map point number} \end{array}$$

According to the above Equation 1, i represents a frame number, j represents a map point number, and X, which represents a state to be estimated through optimization operations, includes a camera pose $C_i$ and a map point $P_j$ per frame.

Figure 7:
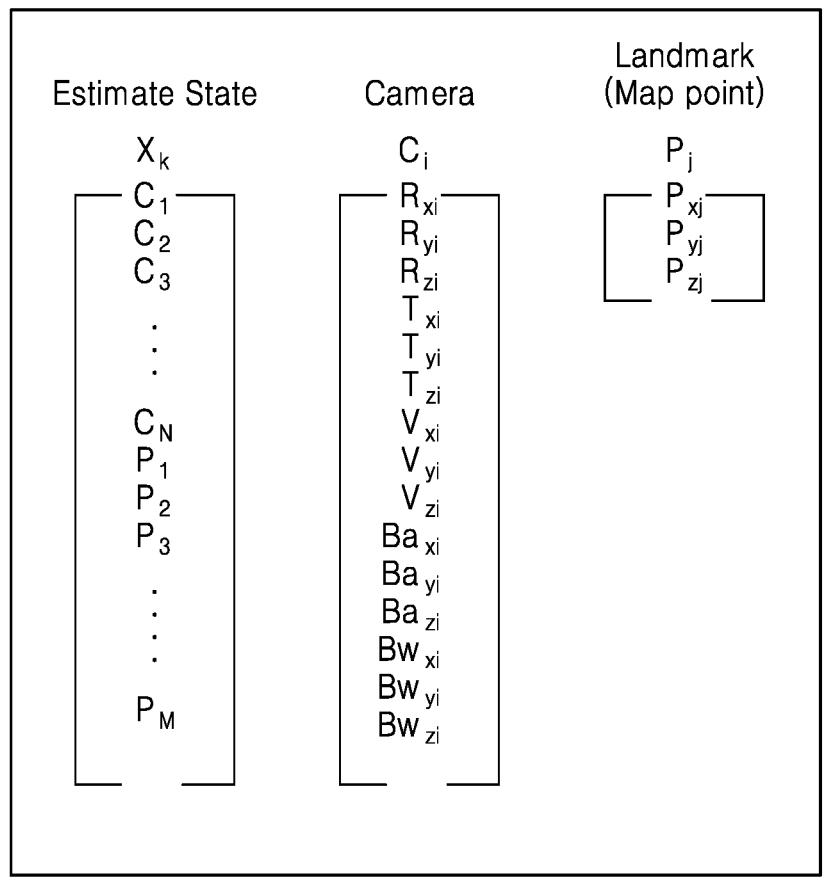

FIG. 7 illustrates an example of a state vector $X_k$ at a time point k when the number of camera poses is N (N is any natural number), and the number of map points is M (M is any natural number). The camera pose $C_i$ (i=1, ..., N) may include rotation elements (e.g., $R_{xi}$, $R_{yi}$, and $R_{zi}$) for three axes (e.g., x-axis, y-axis, and z-axis), translation elements for three axes (e.g., $T_{xi}$, $T_{yi}$, and $T_{zi}$), velocity elements for three axes (e.g., $V_{xi}$, $V_{yi}$, and $V_{zi}$), acceleration elements for three axes (e.g., bias elements of an accelerometer $B_{a_{xi}}$, $B_{a_{yi}}$, and $B_{a_{zi}}$), and angular acceleration elements for three axes (e.g., bias elements of a gyroscope $B_{w_{xi}}$, $B_{w_{yi}}$, and $B_{w_{zi}}$). The map point $P_j$(j=1, ..., M) may include location elements for three axes (e.g., $P_{xj}$, $P_{yj}$, and $P_{zj}$).

Figure 8:
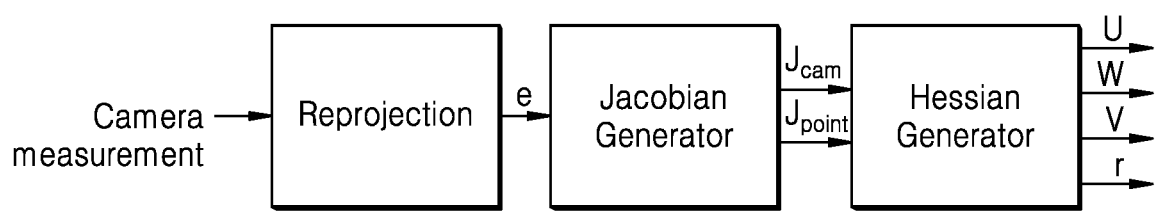

FIG. 8 illustrates an overall process of back-end operations executed by the back-end processor according to an example embodiment when a camera measurement corresponding to a result of front-end operations executed by the front-end processor with respect to the data obtained from the camera is input. According to an example embodiment of the disclosure, the term "measurement" (or "camera measurement") may include a two-dimensional (2D) coordinate of a feature extracted and/or tracked by the front-end processor.

When the camera measurement is input, estimates may be obtained based on reprojection using 3D coordinates of the map point, and based on a difference between the measurements and the estimates, the error e may be calculated. When the error e is calculated, operations for optimizing the objective function according to Equation 1 may be performed.

For optimization of the objective function according to Equation 1, a Gauss-Newton method according to the following Equation 2 may be used.

$$X_{k+1} = X_k - (J_e^T(X_k)J_e(X_k))^{-1}J_e^T(X_k)e(X_k)$$

$$\Delta X = (J_e^T(X_k)J_e(X_k))^{-1}J_e^T(X_k)e(X_k)$$

$$(J_e^T(X_k)J_e(X_k))\Delta X = J_e^T(X_k)e(X_k)$$

$$H(X_k)\Delta X = b(X_k) \quad \text{[Equation 2]}$$

Each time a measurement is input, a state change $\Delta X$ for reducing the error according to the above Equation 1 may be estimated. According to Equation 2, to estimate the state change $\Delta X$, a Jacobian matrix ($J_e(X_k)$) representing a partial differentiation of error and a Hessian matrix ($H(X_k)$) which is a product of a Jacobian transposed matrix ($J_e^T(X_k)$) and a Jacobian matrix ($J_e(X_k)$) need to be calculated.

In one example, when $f_x$ and $f_y$ represent a focal distance of the camera based on the x-axis and the y-axis, respectively, X', Y', and Z' represent 3D coordinate elements of the map point based on a camera coordinate system, and R represents a rotation element of the camera, the Jacobian matrix may be calculated according to the following Equation 3.

[Equation 3]

$$J = [J_C \mid J_P] =$$

$$-\begin{bmatrix} \frac{f_x}{Z'} & 0 & -\frac{f_x X'}{Z'^2} & -\frac{f_x X' Y'}{Z'^2} & f_x + \frac{f_x X'^2}{Z'^2} & -\frac{f_x X'^2}{Z'} \\ 0 & \frac{f_y}{Z'} & -\frac{f_x Y'}{Z'^2} & -f_y - \frac{f_y Y'^2}{Z'^2} & \frac{f_y X' Y'}{Z'^2} & \frac{f_y X'^2}{Z'} \end{bmatrix}$$

$$\left( \begin{bmatrix} \frac{f_x}{Z'} & 0 & -\frac{f_x X'}{Z'} \\ 0 & \frac{f_y}{Z'} & -\frac{f_x Y'}{Z'^2} \end{bmatrix} \right) R \Bigg]$$

According to Equation 3, the Jacobian matrix may be calculated by applying Lie algebra to a Jacobian matrix block $J_c$ regarding a camera pose, and a Jacobian matrix block $J_P$ regarding a map point. The Jacobian matrix block $J_C$ for the camera pose may be a matrix obtained by partial-differentiating a reprojection error by the camera pose, and the Jacobian matrix block $J_P$ for the map point may represent a matrix obtained by partial-differentiating the reprojection error by the map point.

As the Hessian matrix corresponds to the product of the Jacobian transpose matrix and the Jacobian matrix, it may be calculated based on the Jacobian matrix blocks. For example, the Hessian matrix may be calculated according to the following Equation 4.

$$H = J^T J = \begin{bmatrix} J_C^T \\ J_P^T \end{bmatrix} \cdot [J_C \mid J_P] = \begin{bmatrix} J_C^T J_C & J_C^T J_P \\ J_P^T J_C & J_P^T J_P \end{bmatrix} = \begin{bmatrix} U & W \\ W^T & V \end{bmatrix} \quad \text{[Equation 4]}$$

According to the above Equation 4, the Hessian matrix may be divided into four Hessian matrix blocks U, W, $W^T$, and V. Also, according to Equation 4, the relation among the Hessian matrix H of Equation 2, the state change ($\Delta X$) and b may be represented by the following Equation 5.

$$\underline{\cdots} = \begin{bmatrix} r_c \\ r_p \end{bmatrix} \quad \text{[Equation 5]}$$
$$b$$

Referring to Equation 5, the state change ($\Delta X$) may include a state change $\Delta X_c$ regarding a camera pose, and a state change $\Delta X_p$ regarding a map point.

Meanwhile, as described above with reference to FIG. 7, as the camera pose includes 15 elements, and the map point includes three elements, when the number of camera poses is N, and the number of map points is M, the Hessian matrix may be a square matrix having a size of (15N+3M)×(15N+3M). Given the nature of SLAM, as measurement is performed for a number of map points, the size of the Hessian matrix may be quite large. Accordingly, as a significant amount of operations is required to directly solve the Hessian matrix to estimate the state change $\Delta X$, instead of directly solving the Hessian matrix, other alternative methods to estimate the state change $\Delta X$ are required.

As one example of alternative methods, as in the following Equation 6, the state change $\Delta X$ may be estimated by Schur-complement operations using the Hessian matrix blocks U, W, $W^T$, and V.

$$S\Delta X_c = b$$

$$S = U - WV^{-1}W^T$$

$$b = r_c - WV^{-1} r_p$$

$$\Delta X_p = V^{-1}(r_p - W^T \Delta X_C) \quad \text{[Equation 6]}$$

According to the Equation 6, the operation for estimating the state change $\Delta X$ is changed to the matrix operation only for the camera pose (i.e., the operation for the S matrix and b vector), and the state change ($\Delta X_c$) for the camera pose may be obtained first by the changed matrix operation.

After obtaining the state change ($\Delta X_p$) regarding the camera pose, through back substitution, the state change $\Delta X_p$ regarding the map point may be obtained as well. As such, when Schur-complement operations are used to estimate the state change $\Delta X$, operations required for estimation may be reduced significantly, compared to the case of directly solving a Hessian matrix.

Figure 9:
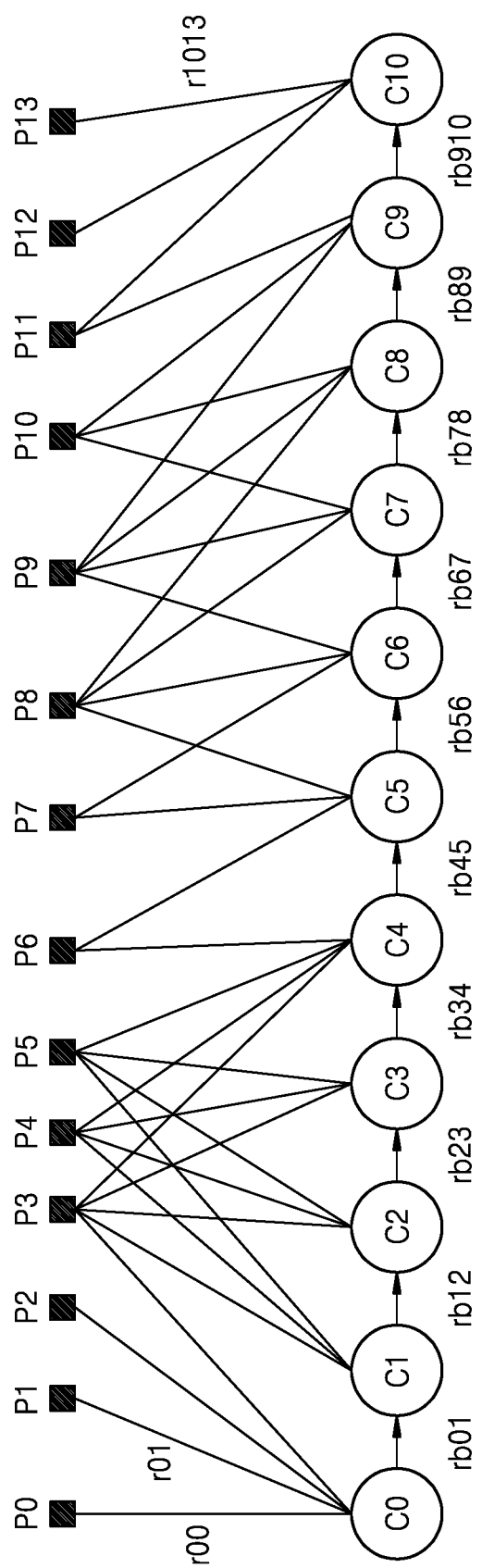

FIG. 9 illustrates an example of a factor graph between map points and camera poses. In FIG. 9, C0 to C10 represent states of consecutive camera poses, and P0 to P13 represent states of map points observed at corresponding camera poses.

Further, r indicates the relation between the map points and the camera poses, and may be represented by a reprojection error. For example, $r_{00}$ represents the relation between the camera pose C0 and the map point P0, $r_{01}$ represents the relation between the camera pose C0 and the map point P1, and $r_{1013}$ represents the relation between the camera pose C10 and the map point P13. Moreover, rb represents the relation between neighboring camera poses. For example, $rb_{01}$ represents the relation between the camera pose C0 and the camera pose C1.

Figure 10:
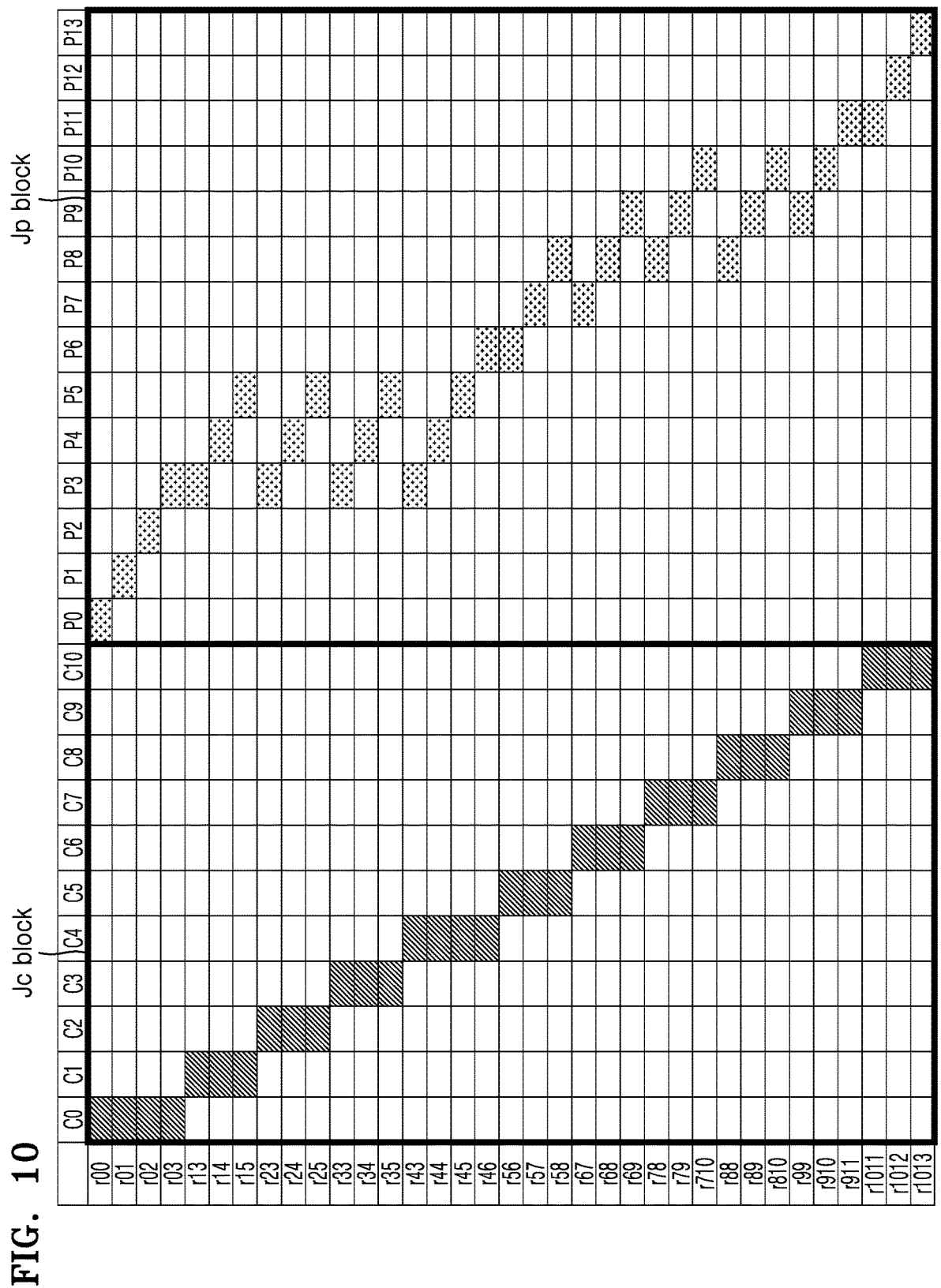

FIG. 10 illustrates an example of the Jacobian matrix according to the factor graph of FIG. 9. The Jacobian matrix may include a Jacobian matrix block $J_c$ for a camera pose and a Jacobian matrix block $J_p$ for a map point.

With reference to FIG. 10, the elements of the Jacobian matrix may be determined according to the relation between the map point and the camera pose. The shaded portions in the Jacobian matrix of FIG. 10 correspond to elements representing the relation between the map points and the camera poses, and the portions which are not shaded may correspond to 0.

Figure 11:
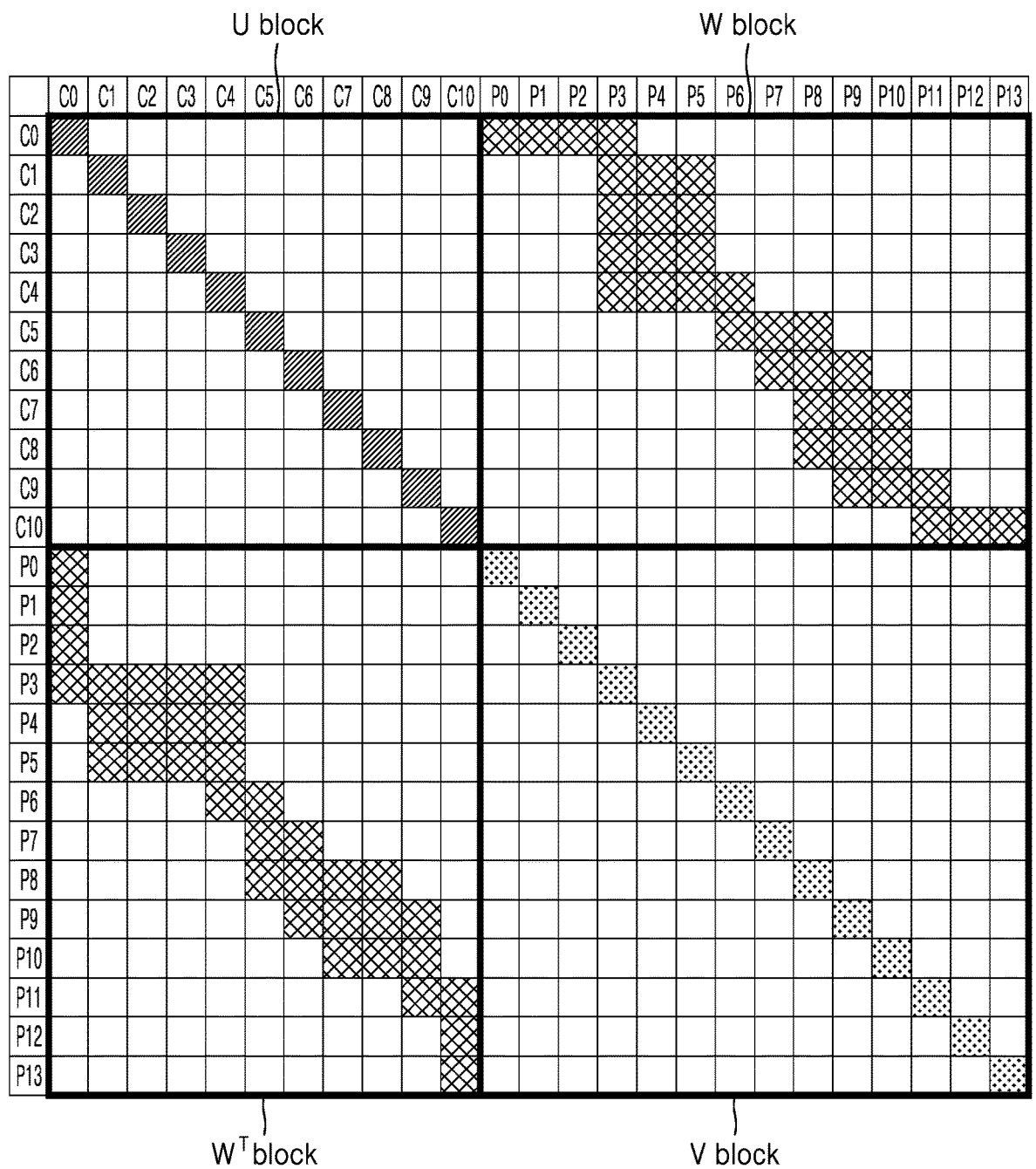

FIG. 11 illustrates an example of the Hessian matrix according to the factor graph of FIG. 9. The Hessian matrix may include a Hessian matrix block U for a camera pose, a Hessian matrix block V for a map point, a matrix block W for a camera pose corresponding to a map point, and a matrix block $W^T$, which is a transposed matrix of the matrix block W.

With reference to FIG. 11, the matrix block W and the matrix block $W^T$ may represent the relation between the map point and the camera pose. For example, the map point P0 of the matrix block W may be obtained in one frame corresponding to the camera pose C0, and the map point P3 of the matrix block W may be obtained in five frames corresponding to C0 to C4.

The matrix block U and the matrix block V may be a diagonal matrix in which data is included only in diagonal elements, not in any other elements. For example, the matrix block U, which is a matrix block of the camera poses C0 to C10, may include data only at a point where the camera poses C0 and C0 meet, a point where the camera poses C1 and C1 meet, ..., and a point where the camera poses C10 and C10 meet. In addition, the matrix block V, which is a matrix block for the map points P0 to P13, may include data only at a point where the map points P0 and P0 meet, a point where the map points P1 and P1 meet, ..., and a point where the map points P13 and P13 meet.

Figure 12:
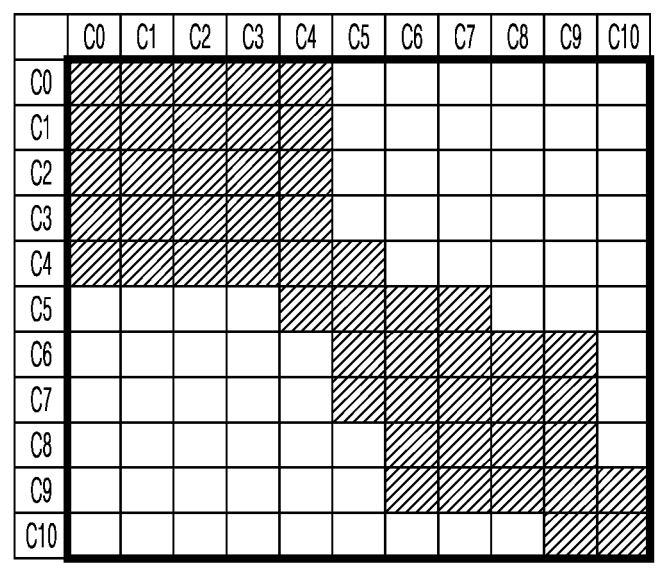

FIG. 12 illustrates an example of the S matrix according to the factor graph of FIG. 9. As such, the S matrix for Schur-complement operations may be a matrix of the camera poses only, and the elements of the S matrix may be calculated based on the above Equation 6.

Meanwhile, FIGS. 9 to 12 are only provided as an example for explanation, and according to some example embodiments, when the factor graph changes, the structures of the Hessian matrix, Jacobian matrix, and S matrix may be changed accordingly.

Figure 13:
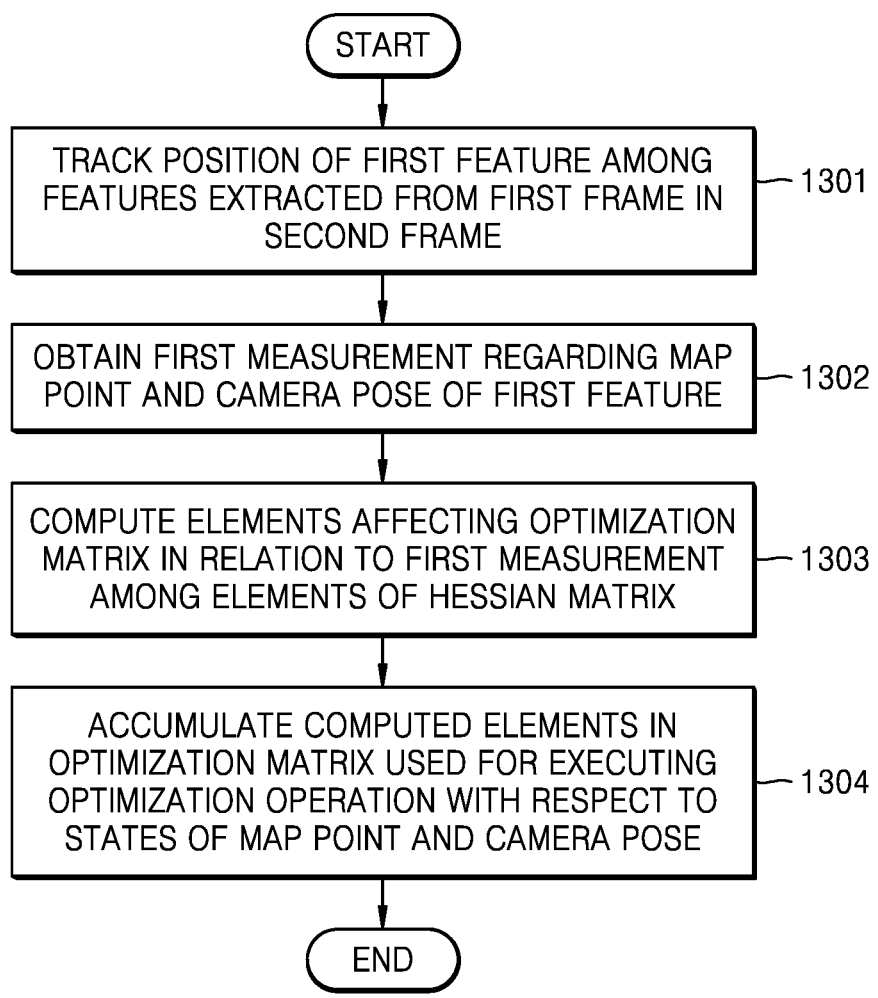
FIG. 13 is a flowchart of a method of accelerating SLAM according to an example embodiment.

FIG. 13 is a flowchart of a method of accelerating SLAM according to an example embodiment. The method of accelerating SLAM illustrated in FIG. 13 may refer to operations performed by the SLAM accelerator 30 illustrated in FIG. 3, and thus any redundant description is limited hereinafter.

With reference to FIG. 13, in operation 1301, a SLAM processor may track positions of features in consecutive frames. According to an example embodiment, the SLAM processor may be SLAM processor 320 (FIG. 3) of a SLAM accelerator 30 of FIG. 3). For example, a front-end processor (e.g., front-end processor 321 of FIG. 3) of the SLAM processor may track a position of a first feature, among features extracted from a first frame, in a second frame subsequent to the first frame.

In operation 1302, the SLAM processor of the SLAM accelerator according to an example embodiment may obtain a measurement regarding a map point and a camera pose based on the positions of the features tracked in operation 1301. For example, a back-end processor (e.g., back-end processor 322 of FIG. 3) of the SLAM processor may obtain a first measurement regarding a map point (e.g., $P_0$ of FIG. 6) and a camera pose (e.g., $C_0$, $C_1$, and $C_2$ of FIG. 6) based on the tracked position of the first feature in the second frame. The first measurement may include a 2D coordinate of a first map point and at least one camera pose corresponding to the first map point.

In operation 1303, after obtaining the first measurement, the SLAM processor of the SLAM accelerator according to an example embodiment may compute elements affecting an optimization matrix in relation to the first measurement, among elements of a Hessian matrix regarding the map point and the camera pose. That is, the SLAM accelerator may compute elements affecting the optimization matrix in relation to the first measurement, among the elements of the Hessian matrix, instead of generating an entire Hessian matrix based on all measurements. For example, the back-end processor of the SLAM processor may compute elements of a matrix block for the camera pose, elements of a matrix block for the map point, and elements of a matrix block for at least one camera pose corresponding to the map point, by using the first measurement.

In operation 1304, the SLAM processor of the SLAM accelerator according to an example embodiment may accumulate the computed elements in the optimization matrix used for executing the optimization operation with respect to states of the map point and the camera pose.

The SLAM accelerator may perform optimization operations with respect to the states of the map point and the camera pose by using the optimization matrix when elements sequentially computed for all measurements are accumulated in the optimization matrix. The optimization operation may include Schur-complement operations, and the optimization matrix may include the S matrix.

Meanwhile, as described above with reference to FIG. 7, as the camera pose includes 15 elements, and the map point includes three elements, when the number of camera poses is N, and the number of map points is M, the Hessian matrix may be a square matrix having a size of (15N+3M)×(15N+3M). Given the nature of SLAM, as measurement is performed for a number of map points, the size of the Hessian matrix may be quite large. Thus, it is difficult to generate a whole Hessian matrix and solve the generated Hessian matrix with high speed and low power.

The SLAM accelerator according to an example embodiment may compute all at once elements affecting the optimization matrix in relation to a single measurement, among elements of the Hessian matrix, instead of generating an entire Hessian matrix regarding the map point and the camera pose based on all measurements through operations 1301 to 1304 described above. That is, the SLAM accelerator may selectively calculate elements that affect the S matrix in relation to the first measurement, among elements of a Hessian matrix, without generating an intermediary Jacobian matrix or a Hessian matrix.

Accordingly, as no Jacobian matrix or Hessian matrix needs to be generated or stored in the SLAM accelerator according to an example embodiment, a size of memory may be reduced. Also, in the SLAM accelerator according to an example embodiment, when tracking of a position of one feature is completed, all operations associated with the feature are processed all at once, and accordingly, there is no need to load the measurement regarding the feature again, which leads to increased operation speed of SLAM.

The elements calculated for a single measurement may be accumulated in an optimization matrix for Schur-complement operations. For example, after the first measurement is input to the first cycle, the SLAM accelerator may sequentially execute operations associated with the first measurement (e.g., operations 1301 to 1304) through consecutive cycles to accumulate elements computed with respect to the first measurement in the optimization matrix. Further, when the second measurement is input to the second cycle subsequent to the first cycle, the SLAM accelerator may execute operations associated with the second measurement, and after executing the operations associated with the first measurement, accumulate elements computed with respect to the second measurement in the optimization matrix.

According to an example embodiment, the SLAM accelerator may estimate a peripheral map and a pose of the electronic device by executing operations for optimization through the optimization matrix in which all measurements are accumulated.

Hereinafter, the process of calculating elements affecting the optimization matrix by the SLAM accelerator is described in detail with reference to FIGS. 14 and 15.

Figure 14:
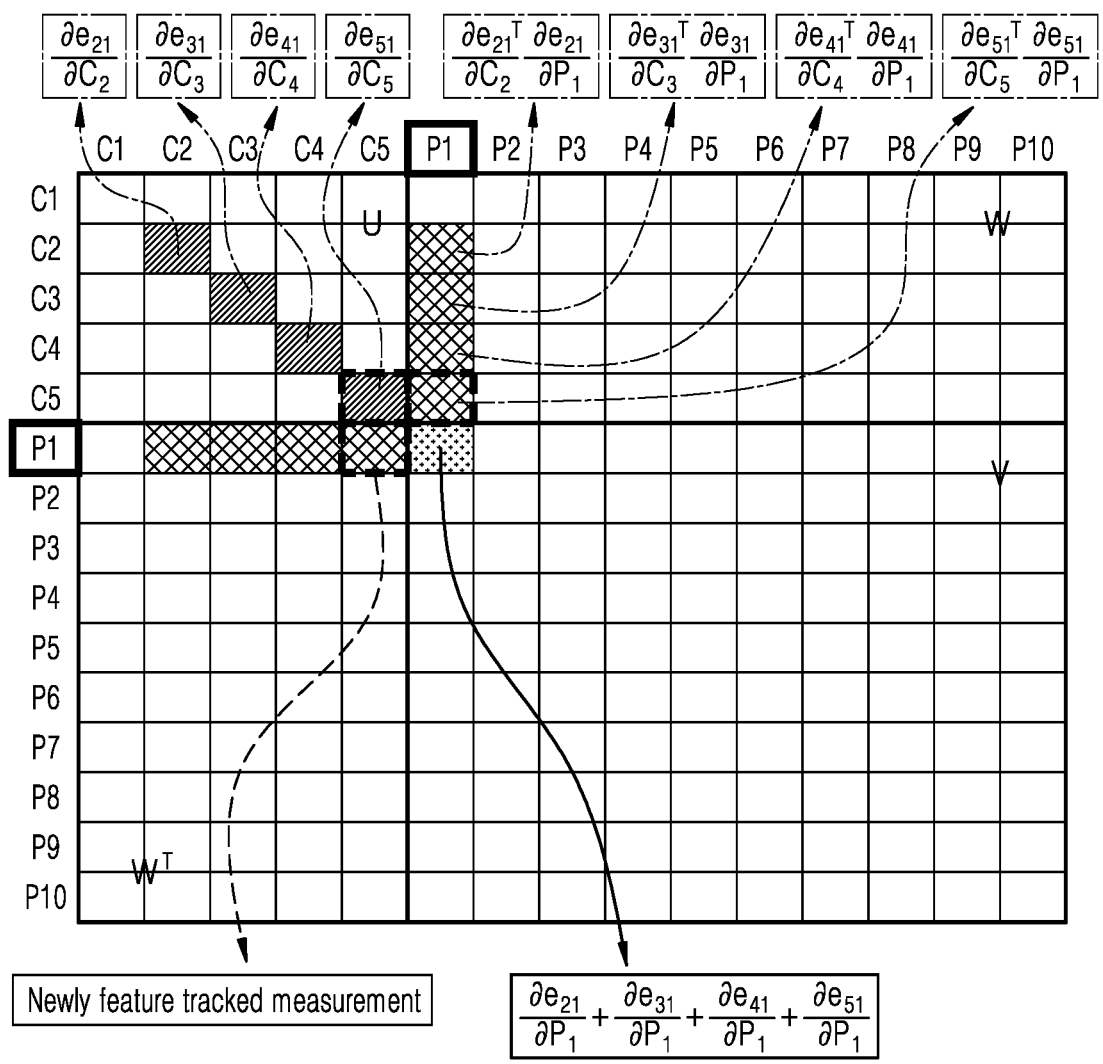
FIGS. 14 and 15 are diagrams for explaining a process of computing elements of an optimization matrix based on a single measurement, according to an example embodiment.
Figure 15:
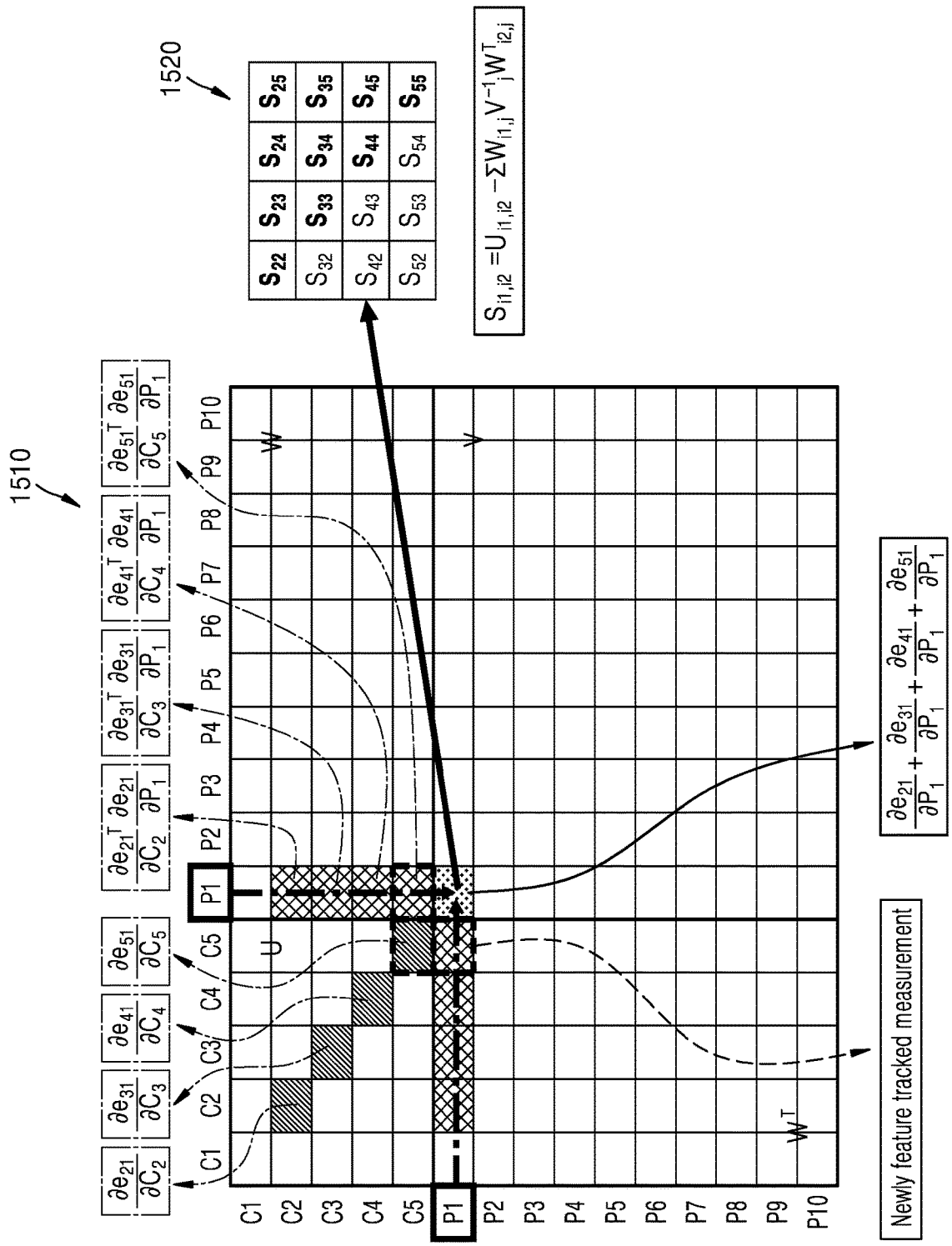

FIGS. 14 and 15 are diagrams for explaining a process of computing elements of an optimization matrix based on a single measurement, according to an example embodiment.

FIG. 14 illustrates an example of measurements including camera poses C1 to C5 and map points P1 to P10.

When the map point P1 is input, the SLAM processor (e.g., SLAM processor 320 of FIG. 3) of the SLAM accelerator according to an example embodiment (e.g., SLAM accelerator 30 of FIG. 3) may calculate elements of a matrix block U regarding a camera pose, elements of a matrix block V regarding a map point, and elements of a matrix block W regarding at least one camera pose corresponding to a map point using the map point P1. Further, the SLAM processor of the SLAM accelerator may calculate r vectors (e.g., $r_c$ and $r_p$ of Equation 5).

For example, when the map point P1 is observed in four frames corresponding to the camera poses C2 to C5, the SLAM accelerator may compute reprojection errors $e_{21}$, $e_{31}$, $e_{41}$, and $e_{51}$. Further, the SLAM accelerator may compute elements of the matrix block U, i.e., $$\frac{\partial e_{21}}{\partial C_2}, \frac{\partial e_{31}}{\partial C_3}, \frac{\partial e_{41}}{\partial C_4}, \text{ and } \frac{\partial e_{51}}{\partial C_5},$$

an element of the matrix block V, i.e., $$\frac{\partial e_{21}}{\partial P_1} + \frac{\partial e_{31}}{\partial P_1} + \frac{\partial e_{41}}{\partial P_1} + \frac{\partial e_{51}}{\partial P_1},$$

and elements of the matrix block W, i.e., $$\frac{\partial e_{21}^T}{\partial C_2}\frac{\partial e_{21}}{\partial P_1}, \frac{\partial e_{31}^T}{\partial C_3}\frac{\partial e_{31}}{\partial P_1}, \frac{\partial e_{41}^T}{\partial C_4}\frac{\partial e_{41}}{\partial P_1}, \text{ and } \frac{\partial e_{51}^T}{\partial C_5}\frac{\partial e_{51}}{\partial P_1}.$$

FIG. 15 illustrates examples of a Hessian matrix 1510 and an S matrix 1520. The SLAM accelerator may compute only the elements (e.g., U, V, W, and r elements) affecting the S matrix 1520 in connection with the map point P1, among the elements of the Hessian matrix 1510, instead of generating the Hessian matrix 1510 by accumulating results of operations performed for each of the measurements. According to an example embodiment, elements affecting the computed S matrix 1520 may be transmitted to a Schur-complement operation unit to execute Schur-complement operations, which is described in detail below.

According to an example embodiment, the SLAM accelerator may generate the S matrix 1520 having the same size as the matrix block U after computing the elements of the matrix block W and the matrix block V, and the elements of the matrix block U, according to Schur-complement operations. For example, the SLAM accelerator may calculate elements of the S matrix 1520 according to the following Equation 7.

$$S_{i1,i2} = U_{i1,i2} - \Sigma W_{i1,j} V^{-1}{}_j W^T{}_{i2,j} \quad \text{[Equation 7]}$$

In Equation 7, i1 and i2 represent an index of a camera pose, and j represents an index of a map point. In the example of FIG. 15, as the map point P1 is observed at the camera poses C2 to C5, a total of 16 elements of an S matrix, i.e., $S_{22}$ to $S_{55}$, may be calculated when the Schur-complement is applied. That is, the Schur-complement operation may only compute values at a position of S matrix corresponding to a camera by which a map point is observed regardless of other map points, and the computed value may be accumulated continuously at the position of the S matrix.

Meanwhile, as the S matrix has a transpose structure with respect to the diagonal, the SLAM accelerator may calculate only diagonal elements and upper triangular elements of the S matrix. Throughout the disclosure, the upper triangular elements may refer to triangular elements at an upper right position of the S matrix with respect to the diagonal elements.

The SLAM accelerator may execute operations for optimization through the optimization matrix in which all measurements are accumulated to estimate a peripheral map and a pose of the electronic device, which is described in detail below.

That is, the SLAM accelerator according to an example embodiment may perform optimization operations for minimizing errors in states of camera poses and map points with high speed and low power.

Figure 16:
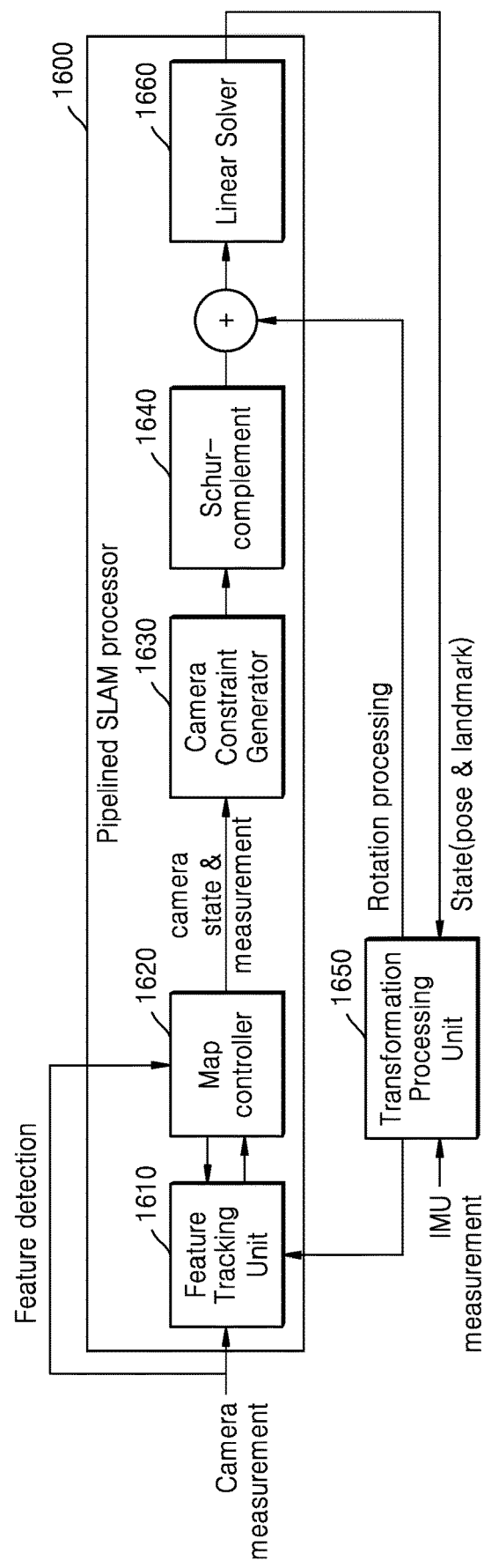
FIG. 16 is a diagram for explaining a pipelined structure of a SLAM processor, according to an example embodiment.
Figure 17:
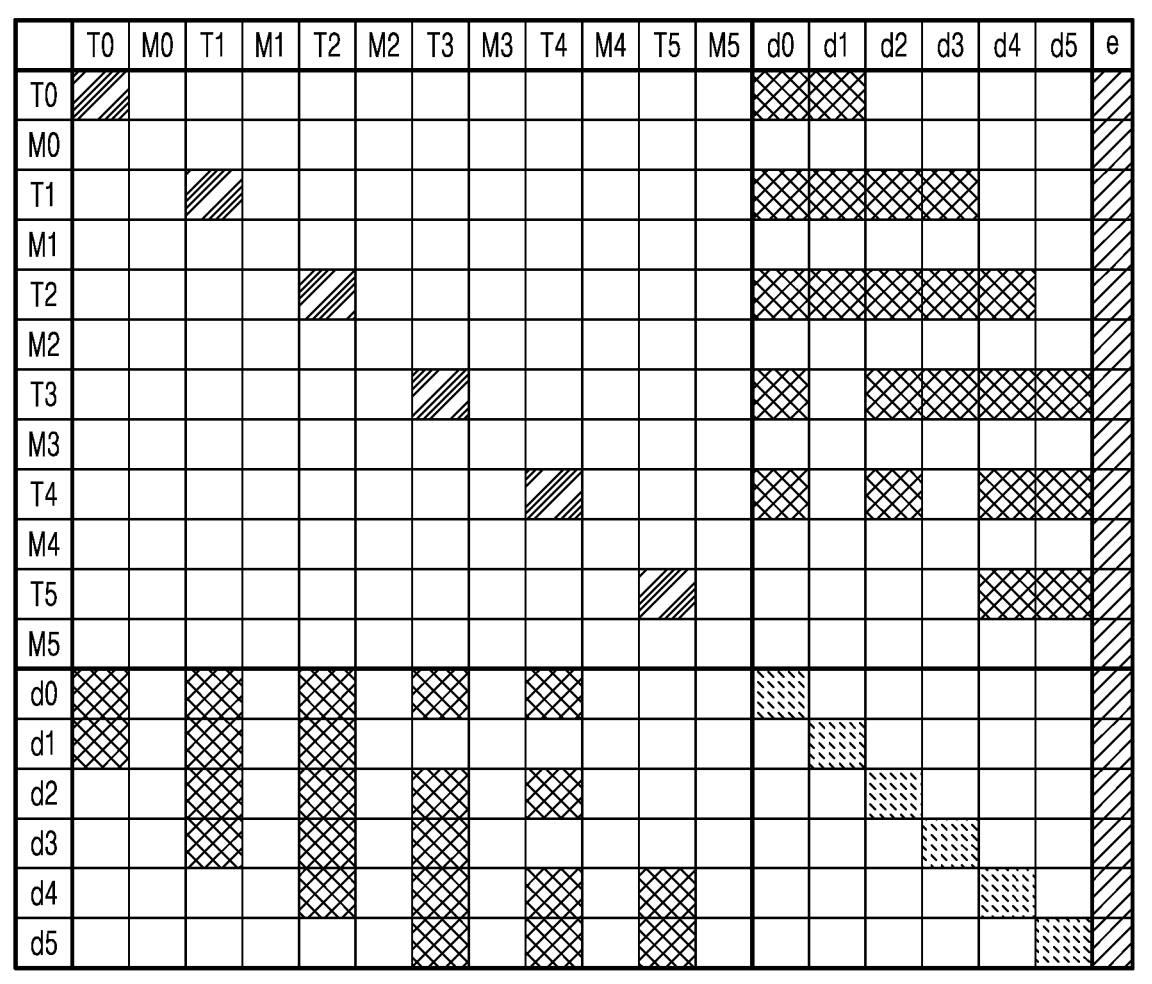
Figure 18:
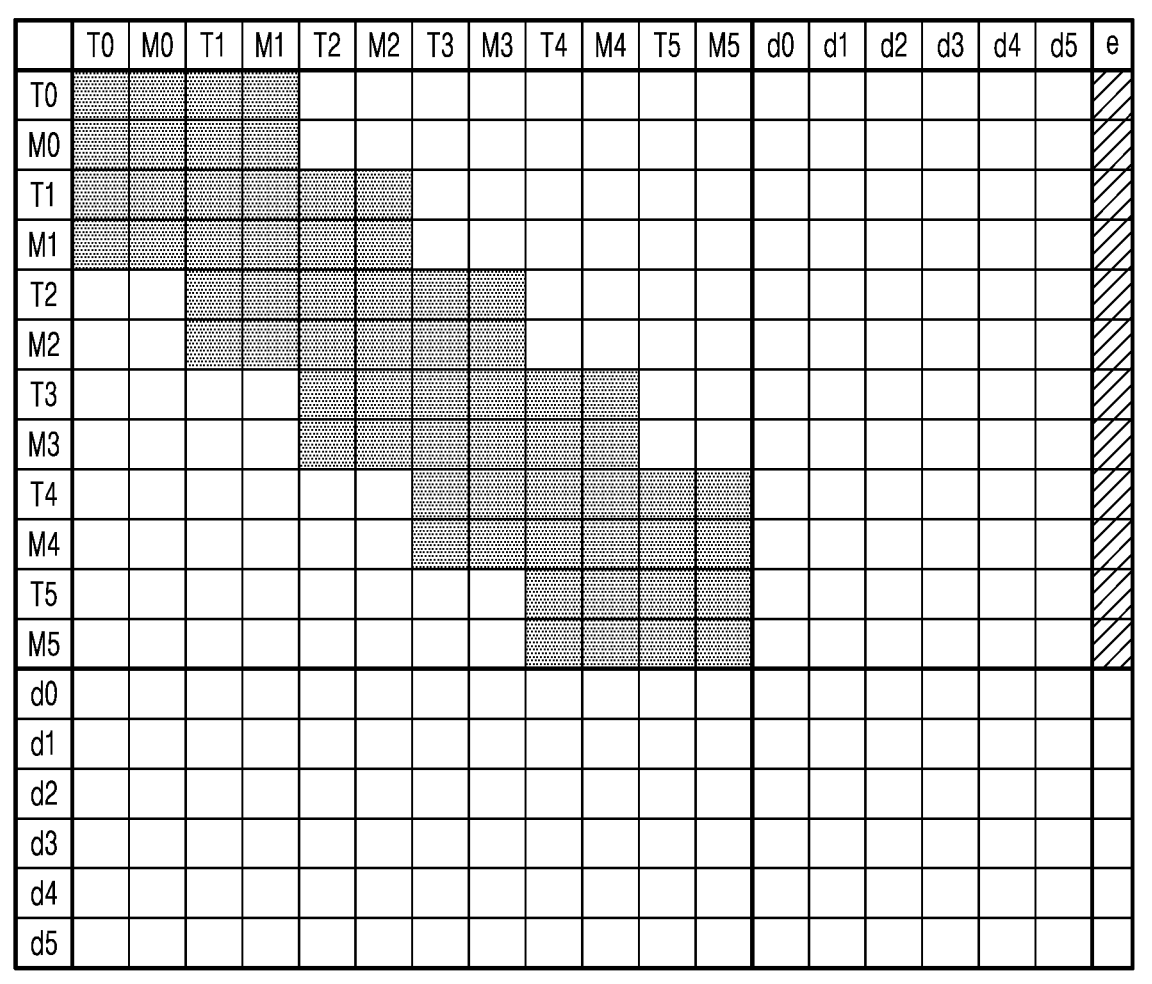
Figure 19:
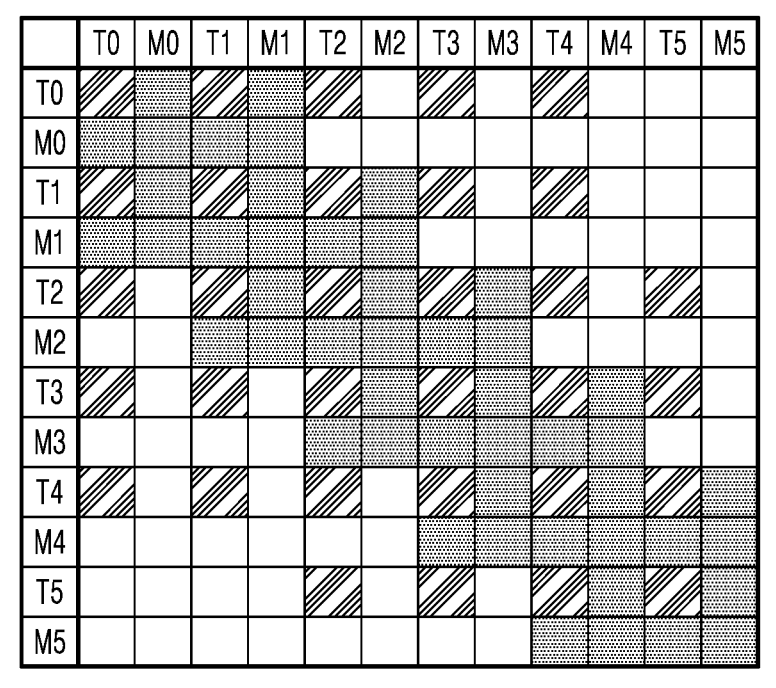

FIG. 16 is a diagram illustrating a pipelined structure of a SLAM processor according to an example embodiment. FIGS. 17 to 19 are diagrams illustrating a camera Hessian matrix, an IMU Hessian matrix, and a final S matrix according to an example embodiment.

With reference to FIG. 16, the SLAM processor (e.g., SLAM processor 320 of FIG. 3) of the SLAM accelerator according to an example embodiment (e.g., SLAM accelerator 30 of FIG. 3) may include a pipelined structure 1600 to rapidly execute the SLAM operation, which requires significant amount of operations, with low power. That is, the SLAM processor may include the pipelined structure 1600 capable of sequentially executing the front-end operations and the back-end operations.

The pipelined structure 1600 of the SLAM processor may include a feature tracking unit 1610, a map controller 1620, a camera constraint generator 1630, a Schur-complement operation unit 1640, and a linear solver 1660.

According to an example embodiment, the feature tracking unit 1610 and the map controller 1620 of the pipelined structure 1600 may be a part of a front-end processor (e.g., front-end processor 321 of FIG. 3) configured to extract features from image data obtained from a sensor (e.g., sensor 110 of FIG. 1) and track positions of the extracted features in consecutive frames.

The feature tracking unit 1610 may track positions of features extracted from image data. That is, the feature tracking unit 1610 may execute operations like operation 1301 of FIG. 13. According to another example embodiment, unlike the process of extracting features from a frame, operations in the process of tracking positions of features may be performed in parallel per each feature. Accordingly, the feature tracking unit 1610 may track in parallel positions of extracted features.

According to an example embodiment, the feature tracking unit 1610 may perform feature detection to additionally extract features according to the number of extracted features. For example, the feature tracking unit 1610 may additionally extract features from image data when the number of extracted features is a designated number. In the disclosure, the term "designated number" may refer to the number of features required to secure accuracy of estimation results of a peripheral map and a pose of an electronic device.

When the number of extracted features is less than or equal to the designated number, the accuracy of the estimated peripheral map and the pose of the electronic device may decrease, and accordingly, the feature tracking unit 1610 may additionally extract features so that the number of features is greater than the designated number. At this time, the additional extraction of features by the feature tracking unit 1610 may be performed under a certain condition, and thus a person skilled in the art may clearly understand that the features are not additionally extracted from all frames.

The map controller 1620 may be electrically or operationally connected to the feature tracking unit 1610 to perform the function of transmitting to the feature tracking unit 1610 data required for tracking positions of features. For example, the map controller 1620 may transmit to the feature tracking unit 1610 sensing data (e.g., inertial information) of a sensor and data regarding positions of features, a size of patch for tracking features, and/or a tracking order of features based on data regarding results of previous SLAM operations. The feature tracking unit 1610 may track positions of features in consecutive frames based on the data transmitted from the map controller 1620. The map controller 1620 is described in detail below.

According to an example embodiment, the camera constraint generator 1630 and the Schur-complement operation unit 1640 may be a part of a back-end operations (e.g., back-end processor 322 of FIG. 3) configured to execute back-end operations of SLAM based on results of front-end operations of SLAM.

The camera constraint generator 1630 may obtain a measurement regarding a map point and a camera pose based on positions of features tracked by the feature tracking unit 1610, and compute elements affecting the optimization matrix in relation to the obtained measurement, among elements of the Hessian matrix regarding the map point and the pose. That is, the camera constraint generator 1630 may execute operations like operations 1302 to 1303 of FIG. 13.

For example, the camera constraint generator 1630 may obtain a first measurement including a first map point and at least one camera pose corresponding to the first map point based on a position of a first feature tracked by the feature tracking unit 1610. Further, the camera constraint generator 1630 may compute elements affecting the optimization matrix in relation to the first measurement, among the elements of the Hessian matrix, instead of generating an entire Hessian matrix based on all measurements.

The Schur-complement operation unit 1640 may accumulate computed elements in the optimization matrix used for executing the optimization operations with respect to the states of the map point and the camera pose. For example, the Schur-complement operation unit 1640 may accumulate elements affecting the optimization matrix in relation to the first measurement, among elements of the Hessian matrix computed by the camera constraint generator 1630. That is, the Schur-complement operation unit 1640 may execute operations like operation 1304 of FIG. 13.

Meanwhile, the SLAM accelerator may estimate a peripheral map and a pose by using only image data obtained from a camera; however, by using sensing data obtained from other sensors such as an IMU, together with the image data, the degree of precision in estimating the peripheral map and pose may be improved. In such case, the SLAM accelerator according to an example embodiment may further include a processing unit 1650 (or "transformation processing unit") in addition to the pipelined structure 1600.

The processing unit 1650 may execute the optimization operation with respect to an IMU measurement obtained from the IMU. For example, the processing unit 1650 may execute a matrix operation, a vector matrix and/or a Lie algebra operation, etc. for the optimization operation with respect to the inertial information obtained from the IMU. The components and/or operations of the processing unit 1650 are further described in detail below.

The elements estimated by using the camera measurements (or "image data") among the elements of the state vector C for the camera pose described above with reference to FIG. 7, may include R and T, and the elements estimated by using the IMU measurements may further include V, $B_a$, and $B_w$ in addition to R and T. Accordingly, the state vector C for the camera pose may be divided into T including a factor affected by both of a camera measurement and a measurement of IMU, and M including a factor affected only by a measurement of IMU (i.e., IMU factor).

FIG. 17 illustrates a Hessian matrix (or camera Hessian matrix) regarding a camera measurement, and FIG. 18 illustrates a Hessian matrix (or IMU Hessian matrix) regarding a measurement of IMU. With reference to FIGS. 17 and 18, as the measurement of the IMU is a factor irrelevant of a map point, unlike the Hessian matrix regarding the camera measurement, the Hessian matrix regarding the measurement of IMU may only include the matrix block U and may not include the matrix block W and the matrix block V which are related to the map point.

Accordingly, the SLAM processor of the SLAM accelerator may compute a first S matrix regarding the image data through the Schur-complement operation unit 1640, and thereafter, add a second S matrix regarding the inertial information to the first S matrix to generate a final S matrix through the processing unit 1650 as shown in FIG. 19.

FIG. 19 illustrates the final S matrix generated by adding the S matrix obtained through the Schur-complement operation unit to the S matrix obtained through the processing unit 1650. The final S matrix shown in FIG. 19 is provided merely as an example, and the form of the final S matrix may be changed according to an example embodiment.

As such, the SLAM processor (e.g., back-end processor) of the SLAM accelerator may divide measurements of features into a first part affected by both of a camera and an IMU, and a second port affected only by the IMU.

The SLAM processor may compute elements of a matrix block for a camera pose, elements of a matrix block for a map point, and elements of a matrix block for at least one camera pose corresponding to the map point, and then accumulate the computed elements in the optimization matrix (e.g., S matrix) firstly by using the first part. Then, the SLAM processor may compute elements of a matrix block for the camera pose by using the second part, and then accumulate the computed elements in the optimization matrix secondarily.

When a final optimization matrix (e.g., S matrix and b vector) is generated, the SLAM processor of the SLAM accelerator may obtain a state change with optimized accumulated errors by performing equation calculation with respect to the final optimization matrix using the linear solver 1660. For example, the linear solver 1660 may solve equations regarding the final optimization matrix through Cholesky decomposition or pre-conditioned conjugate gradient (PCG) to obtain an optimized state change; however, the disclosure is not limited thereto. Accordingly, the SLAM processor of the SLAM accelerator may estimate a peripheral map and a pose of an electronic device.

As the optimization operation regarding the inertial information require less operation amount compared to the optimization operation regarding the image data because of relatively small data amount, and the inertial information does not include a factor related to a map point, the optimization matrix obtained from the image data and the optimization matrix obtained from the inertial information may be computed in parallel. Accordingly, the SLAM accelerator according to an example embodiment may include the processing unit 1650 configured to execute the optimization operation regarding the inertial information separately from the pipelined structure 1600.

The drawings illustrate the embodiment in which the processing unit 1650 is distinguished from the map controller 1620 of the pipelined structure 1600; however, the disclosure is not limited thereto. In another embodiment, the processing unit 1650 may be a low power and small structure arranged inside the map controller 1620.

Even when the tracking of positions of all features is not completed through the pipelined structure 1600, the SLAM accelerator according to an example embodiment may sequentially execute the front-end operations and the back-end operations of SLAM if a position of at least one feature of features is tracked. In other words, the SLAM accelerator may rapidly and efficiently execute with low power the SLAM operation which requires significant operation amount by executing the SLAM operation per feature.

Hereinafter, the overall operations of the map controller 1620 are described in detail with reference to FIGS. 20 to 22.

Figure 20:
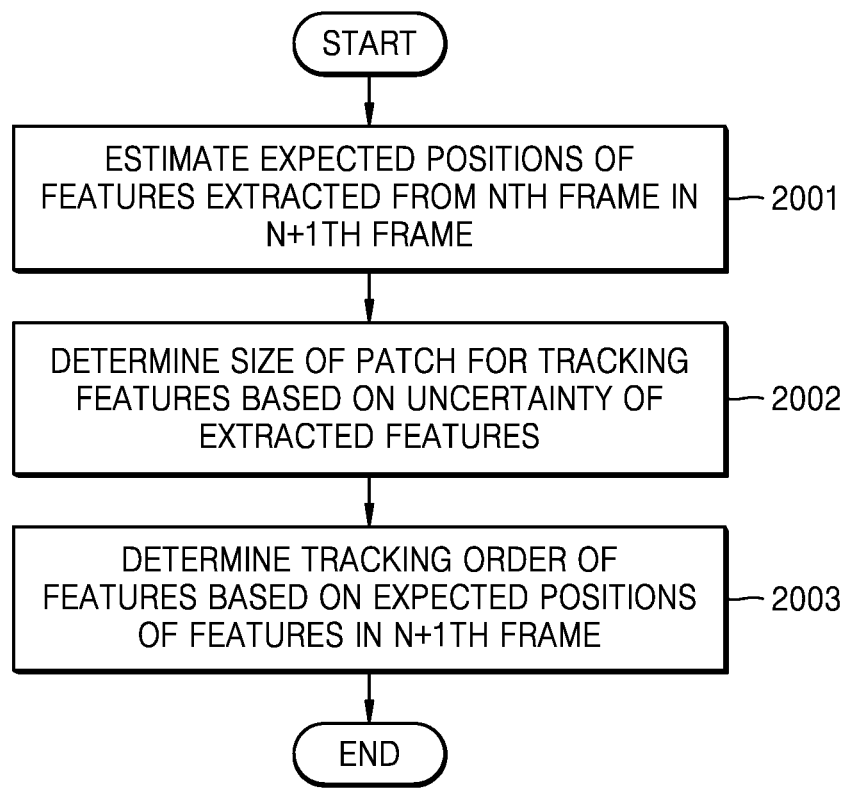
FIG. 20 is a flowchart for explaining overall operations of a map controller of a SLAM processor according to an example embodiment.

FIG. 20 is a flowchart for explaining overall operations of a map controller of a SLAM processor according to an example embodiment. FIGS. 21 and 22 are diagrams for explaining processes of estimating expected positions of features, and determining a tracking order of features according to an example embodiment.

The overall operations of the map controller of FIG. 16 are described with reference to FIGS. 20-22.

Figure 21:
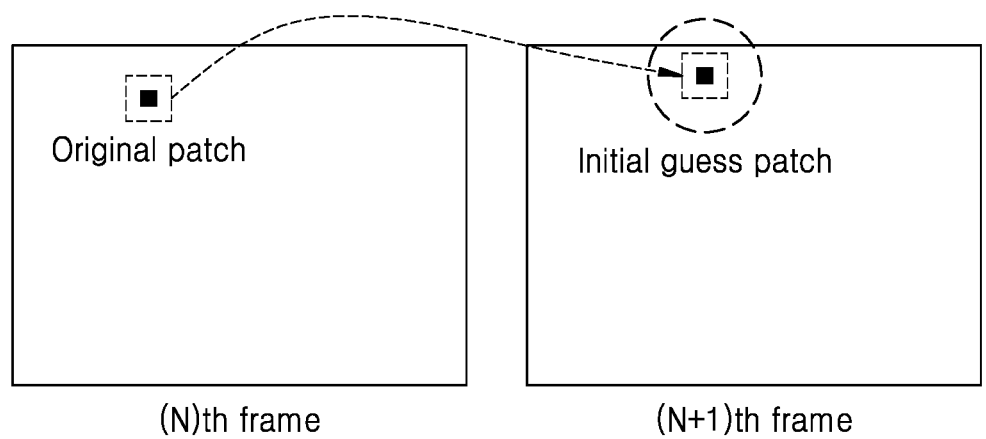
FIGS. 21 and 22 are diagrams for explaining a process of estimating expected positions of features, and determining a tracking order of features, according to an example embodiment.

With reference to FIGS. 20 and 21, in operation 2001, a map controller (e.g., map controller 1320 of FIG. 16) of a SLAM accelerator according to an example embodiment (e.g., SLAM accelerator 30 of FIG. 3) may estimate expected positions of features in consecutive frames. For example, the map controller may estimate expected positions of features extracted from an $N^{th}$ frame (e.g., first frame) in an $N+1^{th}$ frame (e.g., second frame).

According to an example embodiment, the map controller may track expected positions of features in consecutive frames based on a pose change amount of the SLAM accelerator or the SLAM accelerator included an electronic device (e.g., electronic device 100 of FIG. 1) and/or previous SLAM operation results. Throughout the disclosure, the term "previous SLAM operation results" may refer to data regarding a peripheral map and a pose estimated through a SLAM processor in a previous timepoint based on the current time.

For example, when the SLAM accelerator executes the optimization operation by using the inertial information obtained from the IMU, the map controller may obtain data regarding a pose change amount of the SLAM accelerator from a processing unit (e.g., processing unit 1650 of FIG. 16) and track expected positions of features based on the obtained pose change amount and/or the previous SLAM operations results.

In operation 2002, the map controller of the SLAM accelerator according to an example embodiment may determine a size of a patch for tracking positions of extracted features. Throughout the disclosure, the term "patch" may refer to a virtual space set according to a position distribution of a feature.

According to an example embodiment, the map controller may determine a size of a patch for tracking positions of features based on an uncertainty of extracted features. For example, the higher the uncertainty of features is, the greater an area in which the features are positioned may become, and thus, the map controller may increase the patch size in response to a higher uncertainty of extracted features.

Figure 22:
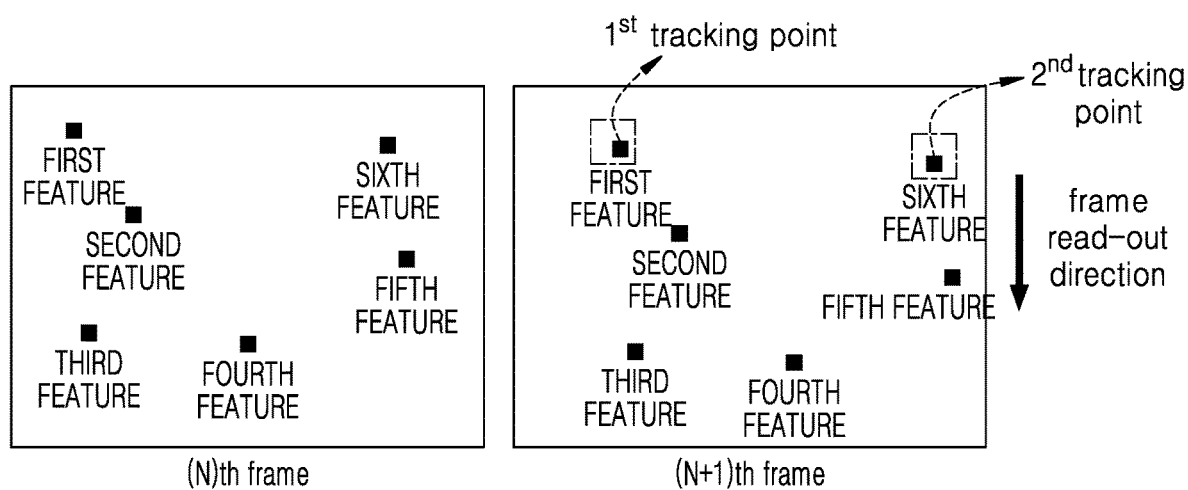

With reference to FIGS. 20 and 22, in operation 2003, the map controller of the SLAM accelerator according to an example embodiment may determine a tracking order of positions of extracted features based on the expected positions of the features. For example, the map controller may determine a tracking order of extracted features in the N+1 frame (e.g., second frame) based on a frame read-out direction.

According to the embodiment of FIG. 22, the frame read-out direction may be a direction towards a lower portion from an upper portion of a frame. In this case, the map controller may determine the tracking order so that a position of the first feature located at the highest portion of the frame is tracked first, and then positions of the sixth feature, the second feature, the fifth feature, the third feature, and the fourth feature may be tracked.

The data regarding the patch size and tracking order of positions of extracted features determined by the map controller through operations 2001 to 2003 may be transmitted to a feature tracking unit (e.g., feature tracking unit 1610 of FIG. 16).

The feature tracking unit 1610 may track positions of features extracted from consecutive frames based on the transmitted data. According to an example embodiment, the feature tracking unit may track positions of the extracted features in order based on the patch determined by the map controller. For example, the feature tracking unit may track the position of the first feature first, and the tracked position of the first feature may be input as a first measurement to a camera constraint generator (e.g., camera constraint generator 1630 of FIG. 16).

Figure 23:
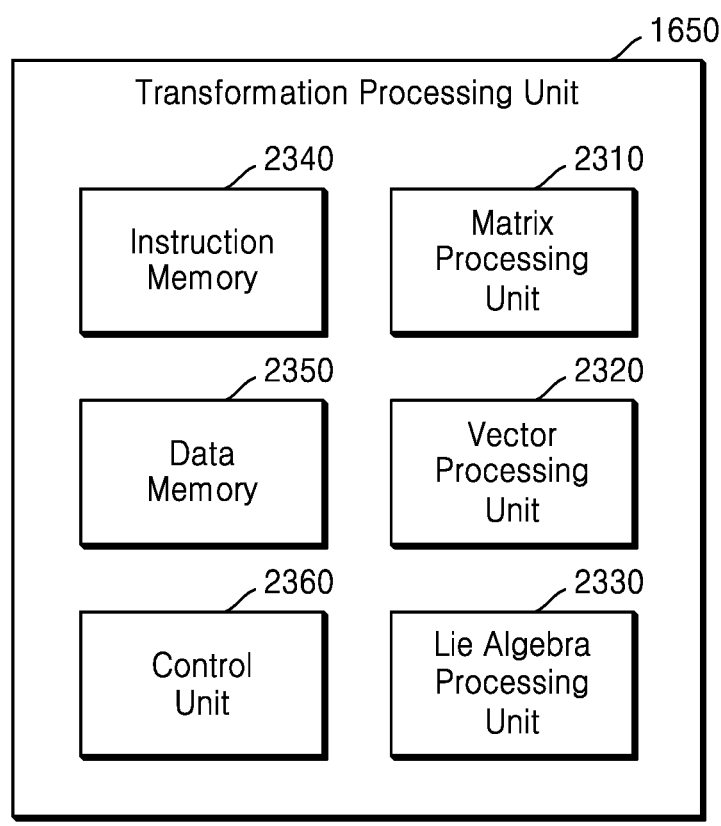
FIG. 23 is a block diagram illustrating components of a processing unit according to an example embodiment.

FIG. 23 is a block diagram illustrating components of a processing unit according to an example embodiment. At this time, the processing unit 1650 of FIG. 23 may be an example of the processing unit 1650 of FIG. 16, and thus, any redundant description thereon is omitted.

With reference to FIG. 23, the SLAM accelerator according to an example embodiment (e.g., SLAM accelerator 30 of FIG. 3) may include the processing unit 1650 to use not only image data obtained from the camera but also inertial information data obtained from the IMU when estimating a peripheral map and a pose.

When the SLAM accelerator includes the processing unit 1650, the objective function according to Equation 1 may be extended to the following Equation 8.

$$\mathrm{argmin}_X \Sigma_i \Sigma_j \|e_{i,j}^{vis}(X)\|^2 + \Sigma_i \|e_{i,j}^{imy}(X)\| \qquad [\text{Equation 8}]$$

In Equation 8, "$e^{vis}$" indicates an error related to a vision factor (or "image factor") and may be represented as the following Equation 9. Further, in Equation 8, "$e^{imu}$" indicates an error related to an inertial information factor (or "IMU factor") and may be represented as the following Equation 10.

$$e_{i,j}(X) = p_{i,j} - \hat{p}(X), \quad X=(P_j, C_i) \qquad [\text{Equation 9}]$$

$$e_r = \mathrm{Log}((\mathrm{Exp}(\Delta J_{ij}^r(b_i - b\hat{\,}_i))\Delta R_{ij})^T R_j R_i^T)$$

$$e_v = R_i(v_j - v_i - g\Delta t_{ij}) - (\Delta v_{ij} + J^v_{ij}(b_i - b\hat{\,}_i))$$

$$e_p = R_i(p_j - p_i - v_{io}\Delta t_{ij} - \tfrac{1}{2}g\Delta t^2_{ij}) - (\Delta p_{ij} + \Delta J^p_{ij}(b_i - b\hat{\,}_i))$$

$$e_b = b_j - b_i \qquad [\text{Equation 10}]$$

In Equations 9 and 10, i and j represent a frame number (or "camera pose number"), and i,j represents pre-integration from the $i^{th}$ frame into the $j^{th}$ frame.

Further, the errors related to the inertial information factor in Equation 10 may be represented by IMU pre-integration factors in the following Equation 11.

$$\Delta R_{ij} \equiv R_i^T R_j = \prod_{k=i}^{j-1} \exp((\omega_k - b_k^g - \eta_k^g)\Delta t) \qquad [\text{Equation 11}]$$

$$\Delta v_{ij} \equiv R_i^T(v_j - v_i - g\Delta t_{ij}) = \sum_{k=i}^{j-1} R_{ik}(a_k - b_k^a - \eta_k^a)\Delta t$$

$$\Delta p_{ij} \equiv R_i^T\left(p_j - p_i - v_i\Delta t_{ij} - \frac{1}{2}g\Delta t^2\right) =$$

$$\sum_{k=i}^{j-1}\left[v_k\Delta t + \frac{1}{2}g\Delta t^2 + \frac{1}{2}R_{ik}(a_k - b_k^a - \eta_k^a)\Delta t^2\right]$$

In Equation 11, R represents a rotation transformation matrix, p represents a position, v represents a velocity, ω represents an angular velocity, and a represents an acceleration. Further, $b^a$ represents a bias of an accelerometer, $b^g$ represents a bias of a gyroscope, $\eta^a$ represent noise of an accelerometer, and $\eta^g$ represents noise of a gyroscope.

With reference to FIGS. 9 to 11, to execute an optimization operation with respect to a rotation matrix representing inertial information, a matrix operation, a vector operation, and a Lie algebra operation as indicated in Equations 12 and 13 may be required.

$$\text{Lie Group} \xrightarrow{\text{Logarithm map}} \text{Lie Algebra} \qquad [\text{Equation 12}]$$
$$R \subset SO(3) \xleftarrow{\text{Exponential map}} \phi \subset so(3)$$
$$\text{Matrix} \qquad\qquad \text{Vector}$$

$$\exp(\phi^\wedge) = I + \frac{\sin(|\phi|)}{|\phi|}\phi^\wedge + \frac{1 - \cos(|\phi|)}{|\phi|^2} \qquad [\text{Equation 13}]$$

$$(\phi^\wedge)^2 \longleftrightarrow Log(R) = \frac{\varphi(R - R^T)}{2\sin(\varphi)}, \varphi = \cos^{-1}\left(\frac{tr(R)-1}{2}\right)$$

$$Log(\exp(\phi)\exp(\delta\phi)) \approx \phi + J_r^{-1}(\phi)\delta\phi$$

$$J_r(\phi) = I - \frac{1-\cos(|\phi|)}{|\phi|^2}\phi^\wedge + \frac{|\phi| - \sin(|\phi|)}{|\phi|^3}(\phi^\wedge)^2$$

$$J_r^{-1}(\phi) = I + \frac{1}{2}\phi^\wedge + \left(\frac{1}{|\phi|^2} + \frac{1+\cos(|\phi|)}{2|\phi|\sin(|\phi|)}\right)(\phi^\wedge)^2$$

In Equations 12 and 13, R indicates a matrix, and φ indicates a vector. A matrix may be converted into a vector through the Lie algebra operation such as Equations 12 and 13.

As the inertial information obtained through the IMU is information of 3D space, to execute the optimization operation with respect to the rotation matrix, a matrix operation of 3×3, a vector operation of 3×1, and a 3D Lie algebra operation may be executed. According to an example embodiment, to execute the optimization operation with respect to the rotation matrix, the matrix operation of 3×3, the vector operation of 3×1, and the 3D Lie algebra operation may be mainly executed.

The processing unit 1650 may not process significant amount of operations as the data quantity is relatively small compared to the operations regarding the image data, and may include components for executing the optimization operation with respect to the inertial information or a rotation matrix which may be executed in parallel with the optimization operation with respect to a map point.

According to an example embodiment, the processing unit 1650 may include a matrix processing unit 2310, a vector processing unit 2320, a Lie algebra processing unit 2330, an instruction memory 2340, a data memory 2350, and a control unit 2360.

The matrix processing unit 2310 may execute operations with respect to a designated matrix, among optimization operations regarding the inertial information or a rotation matrix. For example, the matrix processing unit 2310 may execute operations with respect to a matrix of 3×3, which are mainly executed during the optimization operations regarding the rotation matrix.

The vector processing unit 2320 may execute operations with respect to a designated vector, among optimization operations regarding the inertial information or a rotation matrix. For example, the vector processing unit 2320 may execute operations with respect to a vector of 3×1, which are mainly executed during the optimization operations regarding the rotation matrix.

The Lie algebra processing unit 2330 may execute Lie algebra operations to convert a designated matrix into a designated vector. For example, the Lie algebra processing unit 2330 may convert a 3×3 matrix into a 3×1 vector used in a process of generating an optimization matrix.

The instruction memory 2340 may store instructions for operations of the matrix processing unit 2310, the vector processing unit 2320, and the Lie algebra processing unit 2330. According to an example embodiment, the instructions may be instructions for matrix operations of the matrix processing unit 2310, instructions for matrix or vector operations of the vector processing unit 2320 and/or instructions for the Lie algebra operations of the Lie algebra processing unit 2330. According to an example embodiment, the control unit 2360 may control the matrix processing unit 2310, the vector processing unit 2320, and the Lie algebra processing unit 2330 based on the instructions stored in the instruction memory 2340.

The data memory 2350 may be electrically or operationally connected to the matrix processing unit 2310, the vector processing unit 2320, and the Lie algebra processing unit 2330 to store operation results of the matrix processing unit 2310, the vector processing unit 2320, and the Lie algebra processing unit 2330. The drawings only illustrate the embodiment in which the instruction memory 2340 and the data memory 2350 are separate components; however, according to an example embodiment, the instruction memory 2340 and the data memory 2350 may be formed in an integrated manner.

The control unit 2360 may control overall operations of the processing unit 1650. For example, the control unit 2360 may control operations of the matrix processing unit 2310, the vector processing unit 2320, and the Lie algebra processing unit 2330 based on the instructions stored in the instruction memory 2340. In another example, the control unit 2360 may obtain an optimization matrix (e.g., S matrix, b vector) from inertial information by executing optimization operations with respect to the inertial information (or rotation matrix) based on operation results of the matrix processing unit 2310, the vector processing unit 2320, and the Lie algebra processing unit 2330.

A pipelined structure (e.g., pipelined structure 1600 of FIG. 16) of the SLAM processor may receive from the control unit 2360 data regarding the optimization matrix obtained from the inertial information and add the optimization matrix obtained from the inertial information and the optimization matrix obtained from the image data through the Schur-complement operation unit (e.g., Schur-complement operation unit 1640 of FIG. 16) to generate a final optimization matrix.

Figure 24:
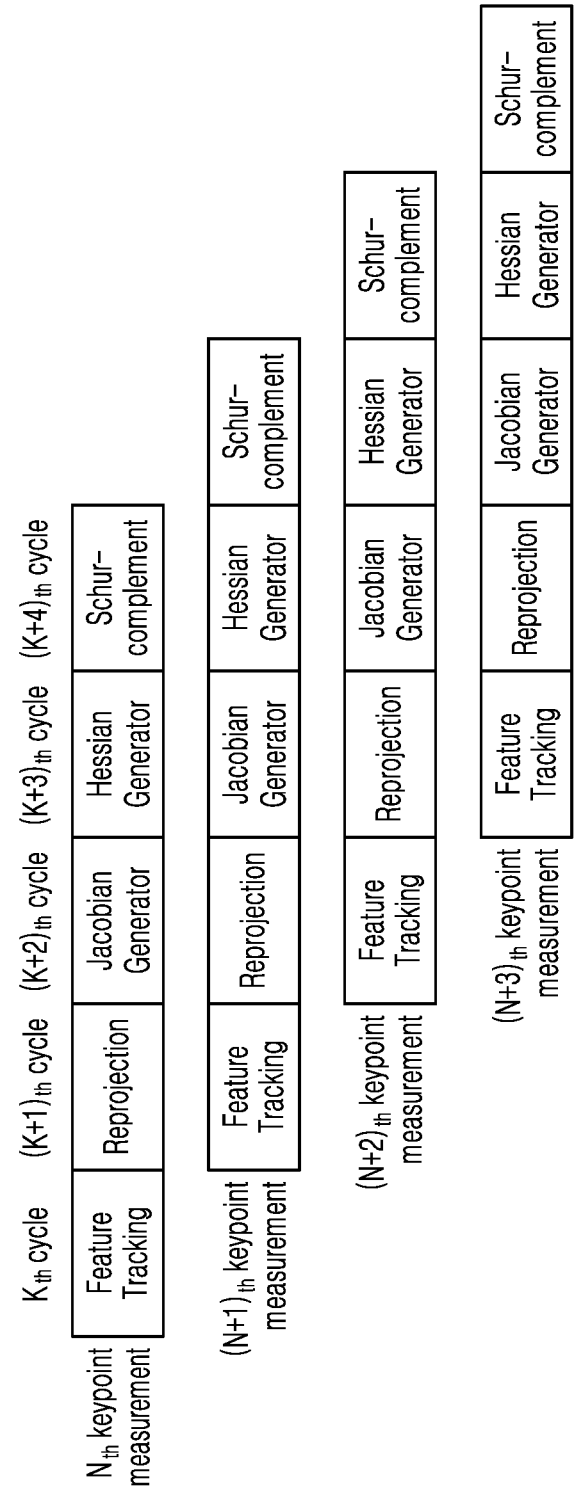
FIG. 24 is a diagram for explaining a pipelined structure of a SLAM accelerator according to an example embodiment.

FIG. 24 is a diagram for explaining a pipeline structure of a SLAM accelerator according to an example embodiment.

FIG. 24 illustrates a process of obtaining, by the SLAM accelerator (e.g., SLAM accelerator 30 of FIG. 3) measurements by tracking positions of features using the pipelined structure and executing operations with respect to the measurements.

The SLAM accelerator may load an input regarding an $N^{th}$ feature, among extracted features, to a $K^{th}$ cycle. When the input associated regarding the Nth feature is loaded to the $K^{th}$ cycle, the SLAM accelerator may track a position of the $N^{th}$ feature in consecutive frames to obtain an $N^{th}$ feature measurement, and sequentially execute operations associated with the $N^{th}$ feature measurement (or keypoint measurement) through consecutive cycles (i.e., $K+1^{th}$ cycle to $K+4^{th}$ cycle). For example, the SLAM accelerator may sequentially execute a reprojection error operation, generate a Jacobian matrix or elements of a Jacobian matrix, generate a Hessian matrix or elements of a Hessian matrix, and execute a Schur-complement operation.

Further, the SLAM accelerator may load an input regarding the $N+1^{th}$ feature to the $K+1^{th}$ cycle. The SLAM accelerator may track a position of the $N+1^{th}$ feature in the $K+1^{th}$ cycle to obtain the $N+1^{th}$ measurement regarding the $N+1^{th}$ feature, and then execute operations with respect to the $N+1^{th}$ measurement after executing the operations associated with the $N^{th}$ measurement. For example, the SLAM accelerator may perform reprojection with respect to the Nth measurement in the $K+1^{th}$ to cycle, and simultaneously track the position of the $N+1^{th}$ feature to obtain the $N+1^{th}$ measurement regarding the $N+1^{th}$ feature. Then, the SLAM accelerator may perform reprojection for the $N+1^{th}$ measurement simultaneously with performing generation of a Jacobian matrix for the $N^{th}$ measurement in the $K+2^{th}$ cycle.

In addition to this, the SLAM accelerator may load an input regarding the $N+2^{th}$ feature to the $K+2^{th}$ cycle, and after tracking a position of the $N+2^{th}$ feature to obtain a $N+2^{th}$ measurement regarding the $N+2^{th}$ feature, the SLAM accelerator may execute operations with respect to the $N+2^{th}$ measurement subsequent to the operations associated with the $N+1^{th}$ measurement. As such, the SLAM accelerator may include a pipeline structure configured to perform each of the plurality of operations for optimizing state variables, and perform operations in relation to the plurality of measurements in parallel. Accordingly, the optimization operation may be executed rapidly, and as a result, the SLAM accelerator may improve the operation speed of the front-end operations and the back-end operations of SLAM.

Figure 25:
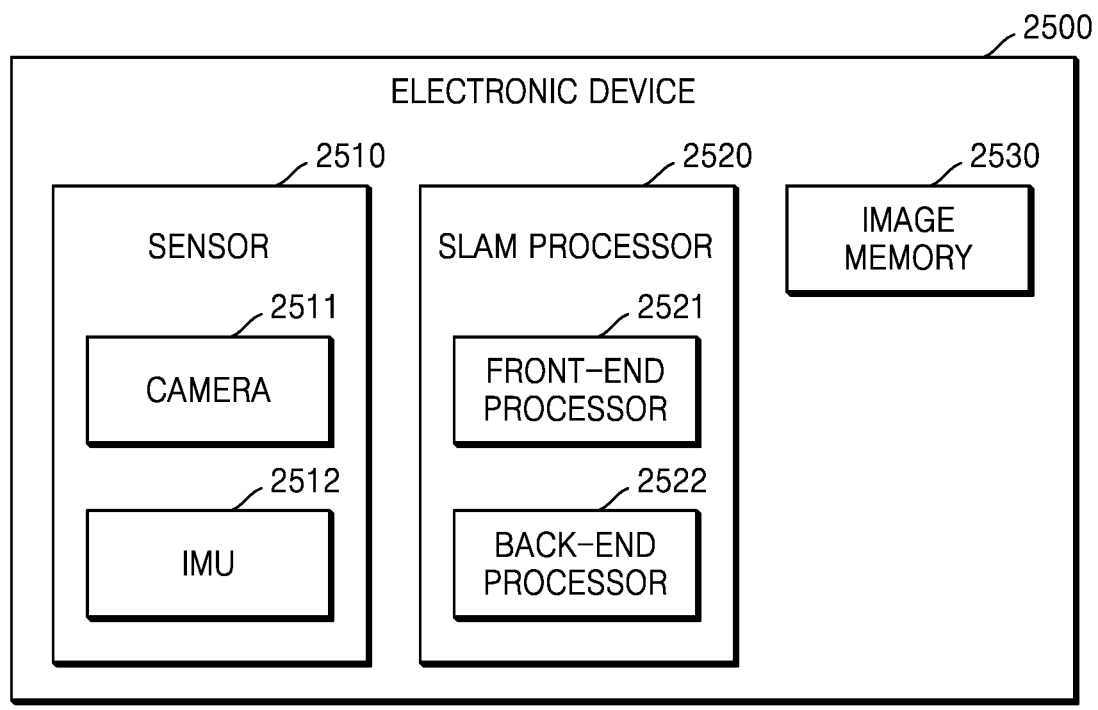
FIG. 25 is a block diagram illustrating components of an electronic apparatus according to an example embodiment.
Figure 26:
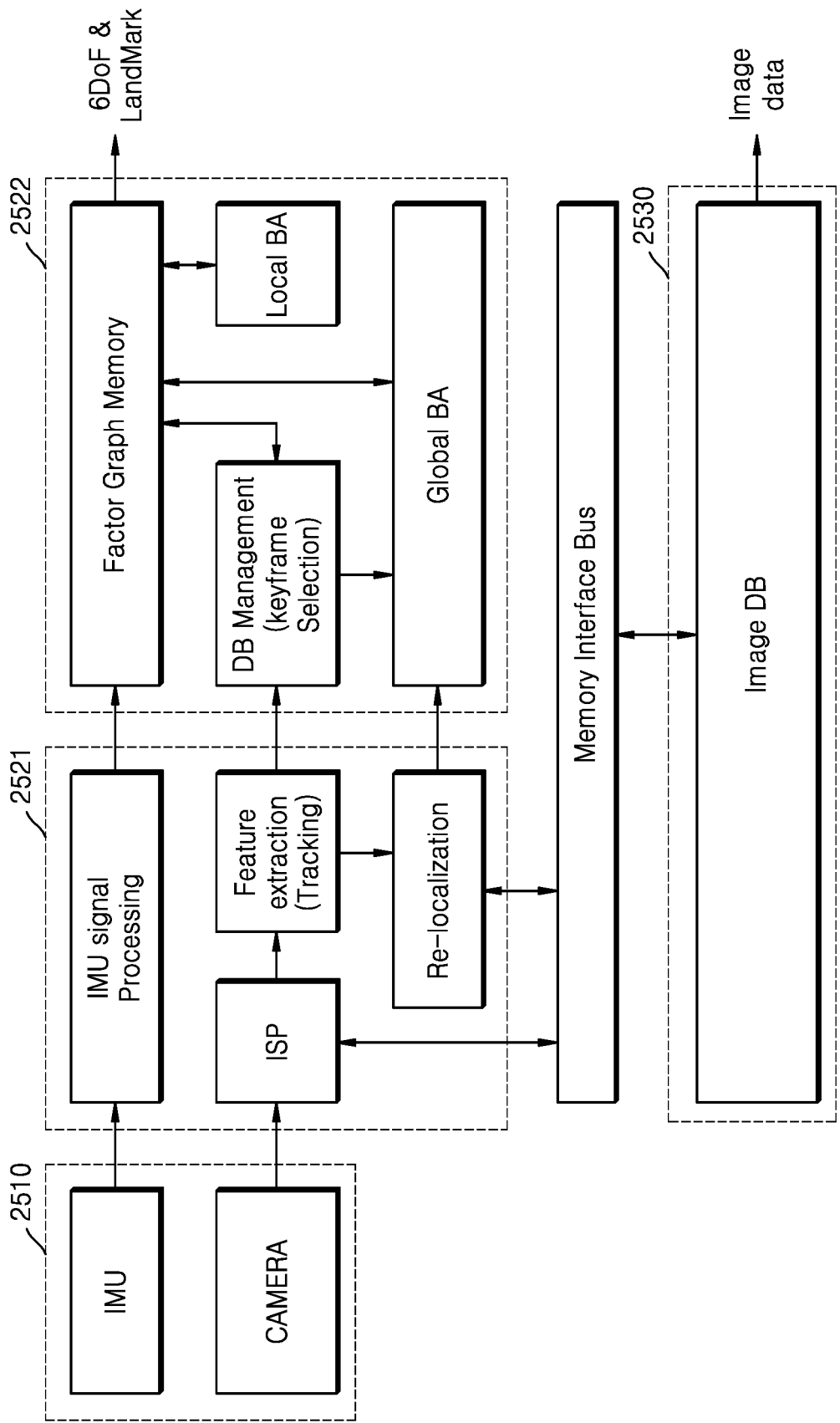
FIG. 26 is a diagram for explaining overall operations of an electronic device according to an example embodiment.

FIG. 25 is a block diagram illustrating components of an electronic apparatus according to an example embodiment, and FIG. 26 is a diagram for explaining overall operations of an electronic device according to an example embodiment.

With respect to FIGS. 25 and 26, an electronic device 2500 according to an example embodiment may include a sensor 2510, a SLAM processor 2520, and an image memory 2530 (or "image database"). The SLAM processor 2520 of the electronic device 2500 according to an example embodiment may be the SLAM processor 320 constituting the SLAM accelerator 30, and thus, any redundant description is omitted hereinafter.

The sensor 2510 may electrically or operationally connected to the SLAM processor 2520 and obtain data required for the SLAM operation. For example, the SLAM processor 2520 may obtain image data regarding a peripheral object of the electronic device 2500 and/or data regarding inertial information of the electronic device 2500 through the sensor 2510.

According to an example embodiment, the sensor 2510 may include a camera 2511 to obtain image data regarding a peripheral object and an IMU 2512 to obtain data regarding inertial information of the electronic device 2500. However, the components of the sensor 2510 are not limited to the above, and according to an example embodiment, the sensor 2510 may include other components (e.g., image sensor, GPS, and odometer) or lack at least one of the aforementioned components (e.g., IMU).

The SLAM processor 2520 may receive data from the sensor 2510 and execute the SLAM operation with respect to the received data to estimate a pose and a peripheral map of the electronic device 2500.

According to an example embodiment, the SLAM processor 2520 may include a front-end processor 2521 (e.g., front-end processor 321 of FIG. 3) configured to execute the front-end operations of SLAM and a back-end processor 2522 (e.g., back-end processor 322 of FIG. 3) configured to execute the back-end operations of SLAM based on results of the front-end operations.

The front-end processor 2521 may extract through a feature extraction algorithm features from image data regarding a peripheral object obtained by the sensor 2510, and track positions of features extracted in consecutive frames. For example, the front-end processor 2521 may extract features from a first frame of image data and track positions of at least one feature of the features in a second frame.

According to an example embodiment, the front-end processor 2521 may be electrically or operationally connected to the image memory 2530 and improve accuracy in feature extraction and tracking by using image data stored in the image memory 2530. For example, the front-end processor 2521 may determine more accurately a position of a map point based on image data (e.g., image regarding a peripheral object) stored in the image memory 2530, which leads to improved increased accuracy in feature extraction and tracking.

Further, the front-end processor 2521 may convert or process data regarding inertial information obtained from the sensor 2510 into data for executing an optimization operation, and the converted or processed data may be stored in a factor graph memory (e.g., factor graph memory 310 of FIG. 3). Although FIG. 26 illustrates that the factor graph memory is included in the back-end processor 2522, the factor graph memory may not necessarily included in the back-end processor 2522. According to an example embodiment, the factor graph memory may be a component separate from the back-end processor 2522.

The back-end processor 2522 may execute the optimization operation based on the results of the front-end operations executed by the front-end processor 2521 to track a pose and a peripheral map of the electronic device 2500. For example, the back-end processor 2522 may execute the optimization operation with respect to features extracted and/or tracked through BA by the front-end processor 2521, and the inertial information to estimate a pose and a peripheral map of the electronic device 2500; however, the disclosure is not limited thereto.

The SLAM processor 2520 may include a pipelined structure capable of sequentially executing the front-end operations of the front-end processor 2521 and the back-end operations of the back-end processor 2522 per a feature or a map point. For example, the SLAM processor 2520 may include the pipelined structure 1600 of FIG. 16, and any redundant description thereon is omitted.

According to an example embodiment, the electronic device 2500 may be a single System-on-Chip (SoC) in which the sensor 2510, the SLAM processor 2520, and the image memory 2530 are integrated. That is, the electronic device 2500 according to an example embodiment may be implemented as a single SoC in which the sensor 2510, the SLAM processor 2520, and the image memory 2530 are integrated, may obtain data for the SLAM operation in a single chip, and continuously execute the SLAM operations with respect to the obtained data.

To miniaturize wearable devices (e.g., AR glasses) or robots performing SLAM, the components for performing SLAM need to be downsized, and the electronic device 2500 according to an example embodiment may be applied to the electronic device 100 of FIG. 1 and/or FIG. 2 or an autonomous robot, resulting in downscaling of the device and minimization of power consumption.

According to an example embodiment, the electronic device 2500 may further include a wireless communication module to perform wireless communication with an external electronic device. According to an example embodiment, the wireless communication module may implemented by one or more electronic circuitry. The electronic device 2500 may receive and/or transmit data with an external electronic device (e.g., mobile electronic device or server) through the wireless communication module including at least one antenna. When the electronic device 2500 includes the wireless communication module, the electronic device 2500 may be a single SoC in which the sensor 2510, the SLAM processor 2520, the image memory 2530, and the wireless communication module are integrated.

According to an example embodiment, one or more components of the pipelined SLAM processor 1600, the transformation processing unit 1650 and/or the electronic device 2500 may be implemented by a hardware, a software or a combination of hardware and software. For example, one or more components of the pipelined SLAM processor 1600, the transformation processing unit 1650 and/or the electronic device 2500 may be implemented by one or more memories, and one or more processors. Also, "units" and "modules" in the disclosure may be implemented by a memory or a processor.

According to an example embodiment, the transformation processing unit 1650 may be implemented by one or more memories, and one or more processors. According to an example embodiment, each of the matrix processing unit 2310, the vector processing unit 2320, and the Lie algebra processing unit 2330 may be implemented by a processor. According to an example embodiment, a same processor may be configured to implement one or more components of the transformation processing unit 1650. According to an example embodiment, the processor may execute software (such as a program code or instructions) to control one or more other components (such as hardware or software components) of the transformation processing unit 1650. As part of data processing or computation, the processor may load commands and/or data received from other components (such as a sensor or a communication module) on a memory, process the commands and/or data stored in the memory, and store resulting data in a memory. The memory may be a volatile memory or a non-volatile memory. The non-volatile memory may include an internal memory and an external memory. The processor may include: a main processor (such as a central processing unit, an application processor, etc.); and a coprocessor (such as a graphics processing unit, an image signal processor, a sensor hub processor, a communication processor) that may be operated independently or in conjunction with the main processor.

Meanwhile, the aforementioned method of accelerating SLAM may be recorded on a computer-readable recording medium on which one or more programs including instructions to execute the method are recorded. The computer-readable recording medium may include a hardware device specifically configured to store and execute program instructions, such as magnetic media including a hard disk, a floppy disk, and a magnetic tape, optical media such as a CD-ROM and a DVD, magneto-optical media such as a floptical disk, ROM, RAM, flash memory, etc. The program instructions may include not only machine language code, which is made by a compiler, but high level language code executable by a computer by using an interpreter, etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for accelerating simultaneous localization and mapping (SLAM), the apparatus comprising:
    a SLAM processor comprising: a front-end processor configured to track, in a second frame subsequent to a first frame, a position of a first feature, among a plurality of features extracted from the first frame; and
    a back-end processor configured to:
        obtain a first measurement corresponding to a map point and a camera pose of the first feature based on the position of the first feature in the second frame tracked by the front-end processor;
        selectively compute one or more first elements affecting an optimization matrix related to the first measurement, among a plurality of elements of a Hessian matrix regarding the map point and the camera pose, and not compute one or more second elements among the plurality of elements of the Hessian matrix; and
        accumulate the computed one or more elements in the optimization matrix used to perform an optimization operation with respect to one or more states of the map point and the camera pose.

2. The apparatus of claim 1, wherein the SLAM processor further comprises a pipelined structure configured to:
    track a position of the first feature in a first cycle, obtain the first measurement based on the position of the first feature tracked through consecutive cycles, and sequentially perform first operations associated with the first measurement, and
    obtain, when a position of a second feature different from the first feature, is tracked in a second cycle subsequent to the first cycle, a second measurement based on the position of the second feature after performing the first operations associated with the first measurement, and perform second operations associated with the second measurement.

3. The apparatus of claim 1, wherein the front-end processor is further configured to extract features from the first frame when a number of features extracted from the first frame is less than or equal to a designated number.

4. The apparatus of claim 1, wherein the front-end processor is further configured to:
    estimate expected positions of the features extracted from the first frame in the second frame based on inertial information of the apparatus;
    determine a size of a patch to track the extracted features based on an uncertainty of the extracted features; and
    determine a tracking order of the extracted features based on the expected positions of the extracted features in the second frame.

5. The apparatus of claim 1, wherein the back-end processor is further configured to compute elements of a first matrix block regarding the camera pose, elements of a second matrix block regarding the map point, and elements of a third matrix block regarding a correspondence between the camera pose and the map point, by using the first measurement.

6. The apparatus of claim 1, wherein the back-end processor is further configured to perform, when elements sequentially computed with respect to all measurements of the extracted features are accumulated in the optimization matrix, the optimization operation with respect to the one or more states of the map point and the camera pose using the optimization matrix.

7. The apparatus of claim 1, wherein the first measurement includes a map point obtained based on data obtained from a sensor comprising a camera and an inertial measurement unit (IMU), and at least one camera pose corresponding to the map point.

8. The apparatus of claim 7, wherein the back-end processor is further configured to divide the first measurement into a first part corresponding to both the camera and the IMU, and a second part corresponding to only the IMU, among the camera and the IMU.

9. The apparatus of claim 8, wherein the back-end processor is further configured to:
compute elements of a first matrix block regarding the camera pose, elements of a second matrix block regarding the map point, and elements of a third matrix block regarding a correspondence between the camera pose and the map point, by using the first part, and accumulate the computed elements of the first matrix block, the second matrix block and the third matrix block in the optimization matrix by using the first part, and
compute elements of the first matrix block regarding the camera pose by using the second part, and accumulate the computed elements of the first matrix block in the optimization matrix.

10. The apparatus of claim 9, further comprising a transformation processor configured to perform operations with respect to the second part,
wherein the transformation processor comprises:
a matrix processing unit configured to perform operations with respect to a designated matrix;
a vector processing unit configured to perform operations with respect to a designated vector; and
a Lie algebra processing unit configured to perform Lie algebra operations to convert the designated matrix into the designated vector.

11. The apparatus of claim 1, wherein the partial matrix block comprises only the one or more first elements related to the first measurement, among the plurality of elements of the entire Hessian matrix.

12. A method of accelerating simultaneous localization and mapping (SLAM), the method comprising:
tracking, in a second frame subsequent to a first frame, a position of a first feature, among a plurality of features extracted from the first frame;
obtaining a first measurement corresponding to a map point and a camera pose of the first feature based on the tracked position of the first feature in the second frame;
selectively computing one or more first elements affecting an optimization matrix related to the first measurement, among a plurality of elements of a Hessian matrix regarding the map point and the camera pose, and not compute one or more second elements among the plurality of elements of the Hessian matrix; and
accumulating the computed one or more first elements in the optimization matrix used to perform an optimization operation with respect to one or more states of the map point and the camera pose.

13. The method of claim 12, further comprising:
tracking a position of the first feature in a first cycle, obtaining the first measurement based on the position of the first feature tracked through consecutive cycles, and sequentially performing first operations associated with the first measurement; and
obtaining, when a position of a second feature, which is different from the first feature, is tracked in a second cycle subsequent to the first cycle, a second measurement based on the position of the second feature after performing the first operations associated with the first measurement, and performing second operations associated with the second measurement.

14. The method of claim 12, further comprising:
estimating expected positions of the features extracted from the first frame in the second frame based on inertial information;
determining a size of a patch to track the extracted features based on an uncertainty of the extracted features; and
determining a tracking order of the extracted features based on the expected positions of the extracted features in the second frame.

15. The method of claim 12,
wherein the computing of the one or more first elements affecting the optimization matrix related to the first measurement comprises computing elements of a first matrix block regarding the camera pose, elements of a second matrix block regarding the map point, and elements of a third matrix block regarding a correspondence between the camera pose and the map point, by using the first measurement.

16. The method of claim 12, further comprising performing the optimization operation with respect to the one or more states of the map point and the camera pose by using the optimization matrix when elements sequentially computed with respect to all measurements of the extracted features are accumulated in the optimization matrix.

17. The method of claim 12, wherein the first measurement includes a map point obtained based on data obtained from a sensor comprising a camera and an inertial measurement unit (IMU), and at least one camera pose corresponding to the map point.

18. The method of claim 17, further comprising dividing the first measurement into a first part corresponding to both the camera and the IMU, and a second part corresponding to only the IMU.

19. The method of claim 18, further comprising:
computing elements of a first matrix block regarding the camera pose, elements of a second matrix block regarding the map point, and elements of a third matrix block regarding a correspondence between the camera pose and the map point, by using the first part, and accumulating the computed elements of the first matrix block, the second matrix block and the third matrix block in the optimization matrix by using the first part; and
computing elements of the first matrix block regarding the camera pose by using the second part, and accumulating the computed elements of the first matrix block in the optimization matrix by using the second part.

20. An electronic device comprising:
a sensor comprising a camera configured to obtain image data and an inertial measurement unit (IMU) configured to obtain inertial information of the electronic device; and a SLAM processor comprising: a front-end processor configured to track, in a second frame subsequent to a first frame, a position of a first feature, among a plurality of features extracted from the first frame; and a back-end processor configured to:
  obtain a first measurement corresponding to a map point and a camera pose of the first feature based on the position of the first feature in the second frame tracked by the front-end processor;
  selectively compute one or more first elements affecting an optimization matrix related to the first measurement, among a plurality of elements of a Hessian matrix regarding the map point and the camera pose, and not compute one or more second elements among the plurality of elements of the Hessian matrix; and
  accumulate the computed one or more first elements in the optimization matrix used to perform an optimization operation with respect to one or more states of the map point and the camera pose.

21. The electronic device of claim 20, wherein the electronic device is a single System-on-Chip.

22. A method of simultaneous localization and mapping (SLAM) of a device including a camera, the method comprising:
  obtaining an image from the camera;
  extracting a first feature and a second feature from the image;
  in a first cycle, tracking a position of the first feature;
  in cycles subsequent to the first cycle, obtaining a first measurement corresponding to a map point and a camera pose of the first feature based on the tracked position of the first feature and selectively computing one or more first elements related to the first measurement and affecting an optimization matrix, among all elements of an Hessian matrix regarding the map point and the camera pose and not compute one or more second elements among the plurality of elements of the Hessian matrix;
  in a second cycle subsequent to the first cycle, tracking a position of the second feature; and
  in cycles subsequent to the second cycle, obtaining a second measurement corresponding to a map point and a camera pose of the second feature based on the tracked position of the second feature and selectively computing the one or more second elements related to the second measurement and affecting the optimization matrix.

* * * * *